(12) United States Patent
Kim et al.

(10) Patent No.: US 12,548,465 B2
(45) Date of Patent: Feb. 10, 2026

(54) INFORMATION OUTPUT DEVICE

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 414 days.

(21) Appl. No.: 18/213,108

(22) Filed: Jun. 22, 2023

(65) Prior Publication Data

US 2023/0335009 A1  Oct. 19, 2023

Related U.S. Application Data

(63) Continuation-in-part of application No. PCT/KR2021/007787, filed on Jun. 22, 2021.

(30) Foreign Application Priority Data

Dec. 23, 2020 (KR) .................. 10-2020-0182537
Aug. 24, 2022 (KR) .................. 10-2022-0106113

(51) Int. Cl.
*G09B 21/00* (2006.01)
*G06F 3/01* (2006.01)

(52) U.S. Cl.
CPC .......... *G09B 21/004* (2013.01); *G06F 3/016* (2013.01)

(58) Field of Classification Search
CPC ............................. G09B 21/004; G06F 3/016
USPC ........................................................ 434/10
See application file for complete search history.

(56) References Cited

U.S. PATENT DOCUMENTS

| | | | |
|---|---|---|---|
| 2015/0317265 A1* | 11/2015 | Iwaki | G06T 1/20 710/267 |
| 2015/0378149 A1* | 12/2015 | Imaizumi | G03B 19/12 359/221.2 |
| 2016/0027967 A1* | 1/2016 | Isa | H10K 59/131 438/26 |
| 2022/0383741 A1* | 12/2022 | Sanchez | G06F 1/163 |

FOREIGN PATENT DOCUMENTS

| | | |
|---|---|---|
| JP | 2002-156898 A | 5/2002 |
| KR | 10-1541926 B1 | 8/2015 |
| KR | 10-2017-0066029 A | 6/2017 |
| KR | 10-2017-0071458 A | 6/2017 |

(Continued)

OTHER PUBLICATIONS

International Search Report for PCT/KR2021/007787 dated Sep. 28, 2021.
Written Opinion for PCT/KR2021/007787 dated Sep. 28, 2021.

*Primary Examiner* — Pierre E Elisca
(74) *Attorney, Agent, or Firm* — Sughrue Mion, PLLC

(57) ABSTRACT

Embodiments of the present disclosure relate to an information output device including one or more information output units, wherein the information output unit includes a driving source portion, an expression portion, a base portion, a first driving portion, and a second driving portion which is disposed between the first driving portion and the expression portion, performs angular movement or rotational movement according to driving of the first driving portion, and is formed to move the expression portion in a first direction toward the first driving portion and in a direction opposite to the first direction.

5 Claims, 20 Drawing Sheets

(56) References Cited

FOREIGN PATENT DOCUMENTS

| KR | 10-2018-0136716 A | 12/2018 |
|----|-------------------|---------|
| KR | 10-2018-0136915 A | 12/2018 |
| KR | 10-2019-0133929 A | 12/2019 |
| KR | 10-2129215 B1 | 7/2020 |
| KR | 10-2020-0119989 A | 10/2020 |

* cited by examiner

INFORMATION OUTPUT DEVICE

TECHNICAL FIELD

Embodiments of the present disclosure relate to an information output device.

BACKGROUND ART

Users may perceive information in a variety of ways. For this purpose, various types of information output devices are being used. For example, a visual information output device using printed matter and an auditory information output device through sound are used.

In particular, with the increase in the amount of information and the development of technology, information output devices including electronic technology are widely used in modern times, and display devices having a plurality of pixels are commonly used as visual information output devices.

However, in the case of these display devices, various circuits are embedded, which causes a reduction in ease of manufacture and an inconvenience in control.

Meanwhile, various types of information output forms are required due to technological development, diversification of lifestyle, and the like.

As an example, various information output devices may be required according to the situation of each user, and information output through tactile sense is required for users with weakened specific senses, for example, users with weak or no visual ability. In the case of outputting information through tactile sense, there are difficulties in easily controlling and driving the information, so there is a limit to improving user convenience through the improvement of information output devices.

DETAILED DESCRIPTION OF THE DISCLOSURE

Technical Problem

Embodiments of the present disclosure have been devised to improve the above limitations and are directed to providing an information output device of which durability is improved and which is capable of improving user convenience.

However, these problems are exemplary, and the scope of the present disclosure is not limited thereby.

Technical Solution to Problem

One embodiment of the present disclosure relates to an information output device including one or more information output units, wherein the information output unit includes a driving source portion connected to a power supply and disposed such that a current flows, an expression portion formed and disposed to be detected by a user, a base portion in which the driving source portion and the expression portion are accommodated, a first driving portion disposed in the base portion and driven by a current flowing in the driving source portion, and a second driving portion which is disposed between the first driving portion and the expression portion, performs angular movement or rotational movement according to driving of the first driving portion, and is formed to move the expression portion in a first direction toward the first driving portion and in a direction opposite to the first direction.

In the present disclosure, a first magnetic force portion, which has regions having different polarities, may be disposed in the first driving portion, and a second magnetic force portion, which has regions having different polarities, may be disposed in the second driving portion.

In the present disclosure, the driving source portion may be disposed outside the first driving portion and may be formed of a coil.

In the present disclosure, the base portion may include a first accommodating portion in which the driving source portion is accommodated, a second accommodating portion which is disposed to face the first accommodating portion and in which the expression portion is accommodated, and a third accommodating portion which connects the first accommodating portion and the second accommodating portion to each other and in which the first driving portion and the second driving portion are disposed.

In the present disclosure, the information output device may include the plurality of information output units, and the plurality of information output units may be spaced apart from each other in one direction or another direction.

Another embodiment of the present disclosure relates to an information output device including one or more information output units, wherein the information output unit includes a driving source portion connected to a power supply and disposed such that a current flows, an expression portion formed and disposed to be detected by a user, a base portion in which the driving source portion and the expression portion are accommodated, a first driving portion disposed in the base portion and driven by a current flowing in the driving source portion, and a second driving portion which is disposed between the first driving portion and the expression portion, is rotatably disposed in the base portion, and performs angular movement or rotational movement according to driving of the first driving portion to transmit power to the expression portion.

In the present disclosure, the base portion may include a first accommodating portion in which the driving source portion is accommodated, a second accommodating portion which is disposed to face the first accommodating portion and in which the expression portion is accommodated, and a third accommodating portion which connects the first accommodating portion and the second accommodating portion to each other and in which the second driving portion is disposed.

In the present disclosure, the first driving portion may include a first magnetic force portion and may be disposed inside the driving source portion.

In the present disclosure, the first driving portion may share a longitudinal central axis with the driving source portion.

In the present disclosure, the information output device may include the plurality of information output units, and the plurality of information output units may be spaced apart from each other in one direction or another direction.

Other aspects, features and advantages other than those described above will become apparent from the following drawings, claims and detailed description of the invention.

Advantageous Effects of Disclosure

An information output device according to the present disclosure has an effect of improving durability and improving user convenience.

BEST MODE

Figure 1:
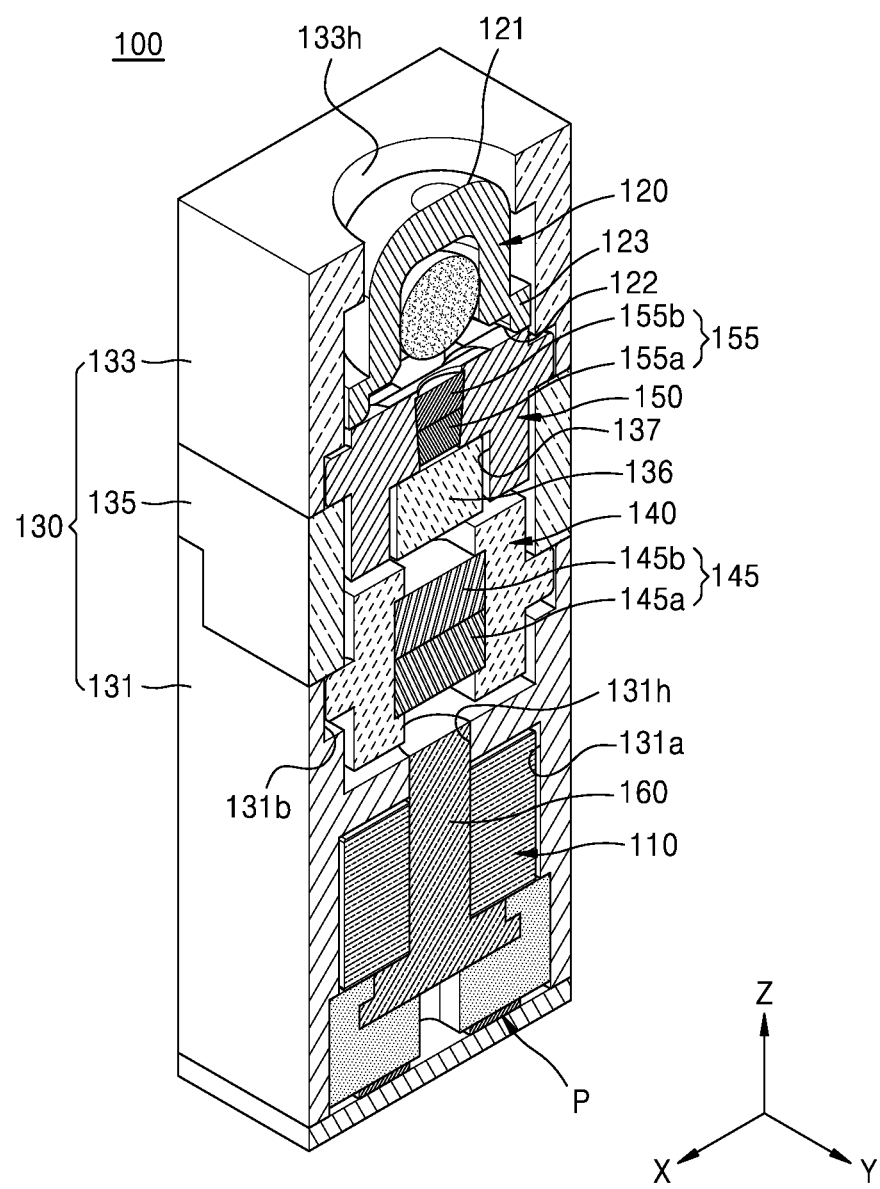
FIG. 1 is a cross-sectional perspective view illustrating an information output device according to one embodiment of the present disclosure.

Since the present disclosure can apply various transformations and have various embodiments, specific embodiments will be illustrated in the drawings and described in detail in the detailed description. Effects and features of the present disclosure, and methods for achieving them will become clear with reference to the embodiments described later in detail together with the drawings. However, the present disclosure is not limited to the embodiments disclosed below and may be implemented in various forms.

Hereinafter, embodiments according to the present disclosure will be described in detail with reference to the accompanying drawings, and in the description with reference to the accompanying drawings, the same or corresponding components are assigned the same reference numerals, and duplicate descriptions thereof will be omitted.

In the following embodiments, the terms first, second, and the like do not have limited meaning but are used for the purpose of distinguishing one element from another element.

In the following embodiments, singular expressions include plural expressions unless the context clearly dictates otherwise.

In the following examples, the term "comprising" or "having" is meant to imply the presence of a feature or component described in the specification and does not preclude the possibility that one or more other features or components may be added.

It will be understood that when a layer, region, or component is referred to as being "on" another layer, region, or component, it may be "directly on" the other layer, region, or component or may be "indirectly on" the other layer, region, or component with one or more intervening layers, regions, or components therebetween.

Sizes of components in the drawings may be exaggerated for convenience of description. For example, since the size and thickness of each component shown in the drawings are arbitrarily shown for convenience of description, the present disclosure is not necessarily limited to the illustrated to what is shown.

When a certain embodiment may be implemented differently, a particular process order may be performed differently from the described order. For example, two consecutively described processes may be performed substantially at the same time or performed in an order opposite to the described order.

In the following embodiments, it will be understood that when a layer, region, or component is referred to as being "connected to" another layer, region, or component, it may be "directly connected to" the other layer, region, or component or may be "indirectly connected to" the other layer, region, or component with one or more intervening layers, regions, or components therebetween. For example, it will be understood that when a layer, region, or component is referred to as being "electrically connected to" another layer, region, or component, it may be "directly electrically connected to" the other layer, region, or component or may be "indirectly electrically connected to" the other layer, region, or component with one or more intervening layers, regions, or components therebetween.

Figure 2:
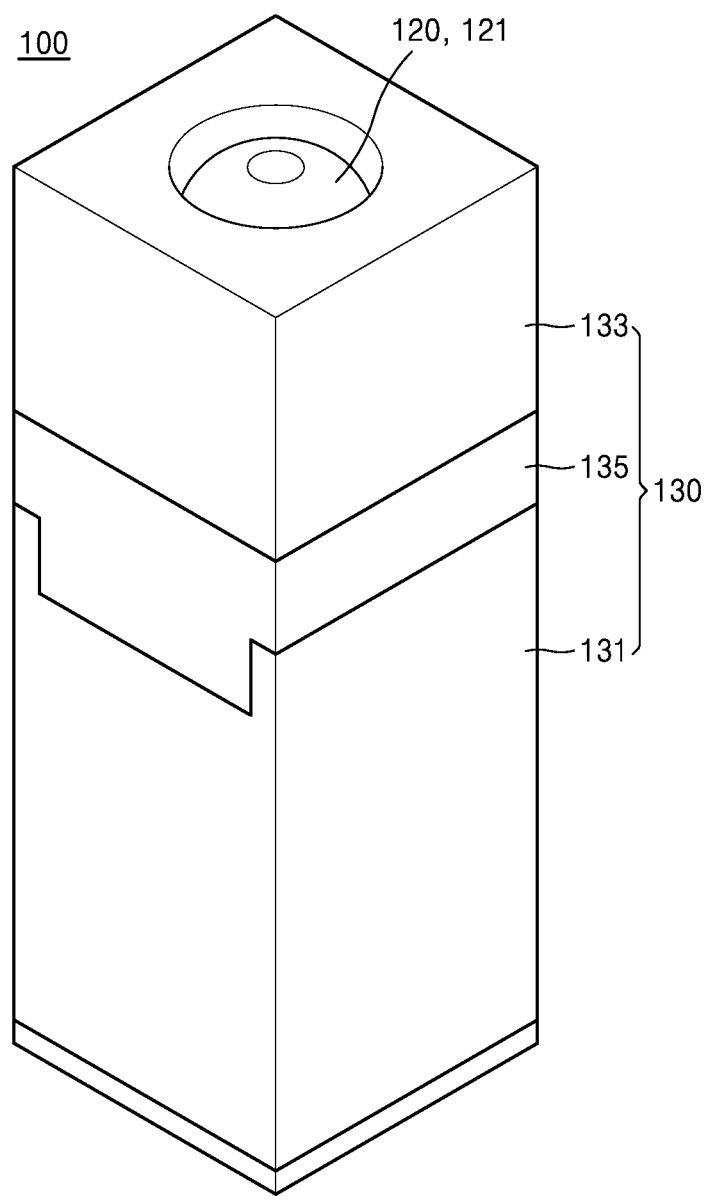
FIG. 2 is a perspective view illustrating the information output device according to one embodiment of the present disclosure.
Figure 3:
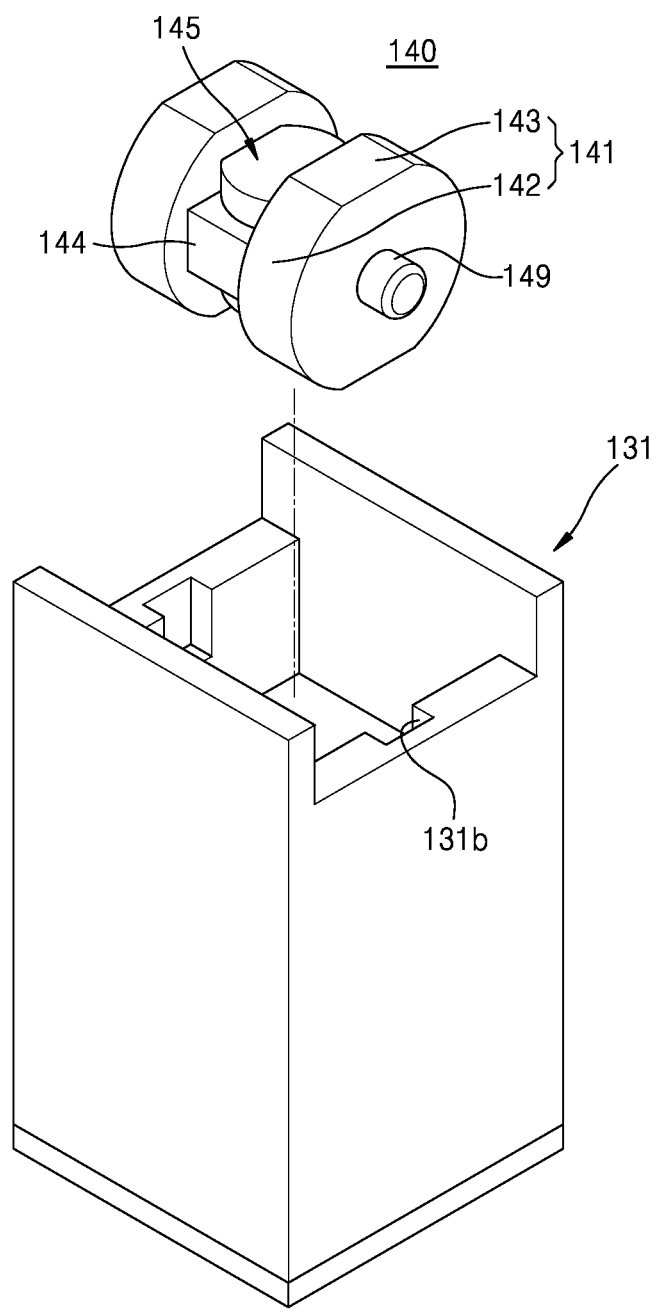
FIG. 3 is a perspective view illustrating a first accommodating portion and a first driving portion according to one embodiment of the present disclosure.
Figure 4:
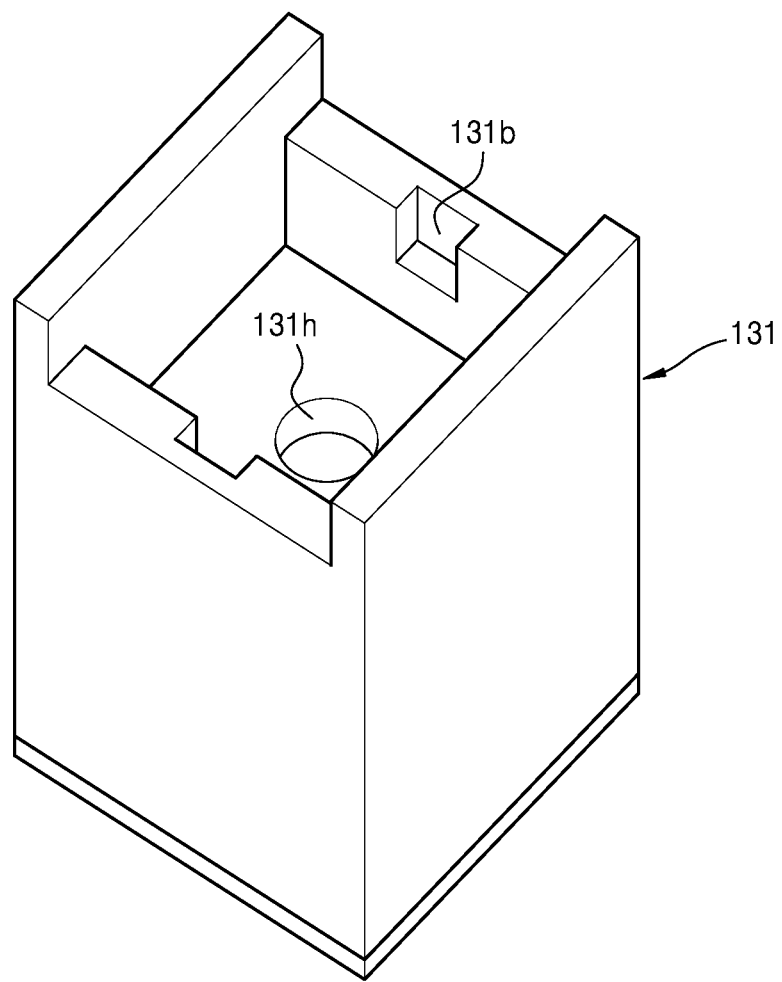
FIG. 4 is a perspective view illustrating the first accommodating portion according to one embodiment of the present disclosure.
Figure 5:
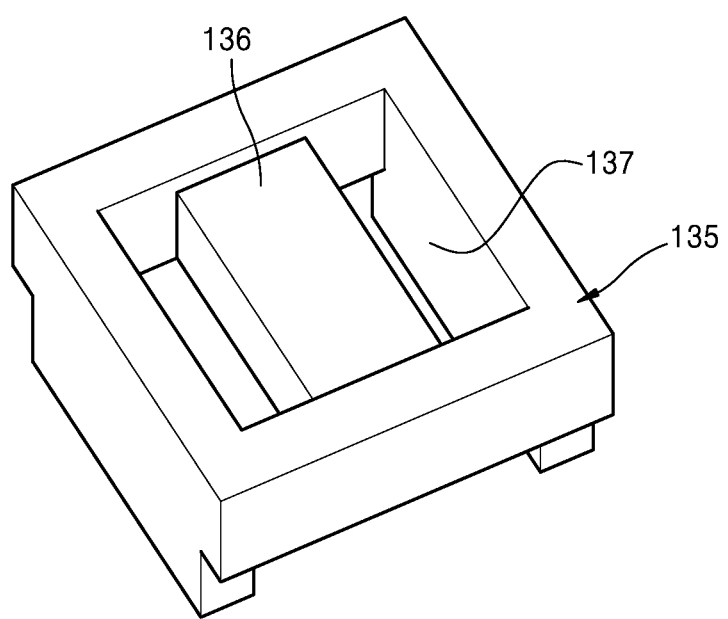
FIG. 5 is a perspective view illustrating a third accommodating portion according to one embodiment of the present disclosure.
Figure 6:
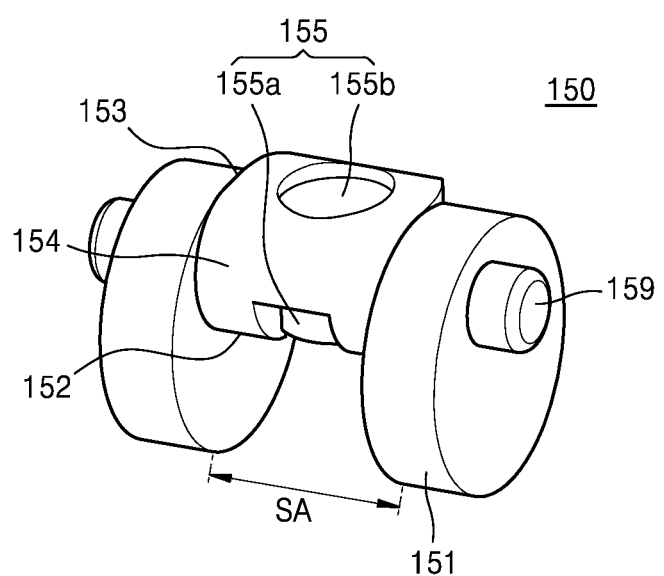
FIG. 6 is a perspective view illustrating a second driving portion according to one embodiment of the present disclosure.
Figure 7:
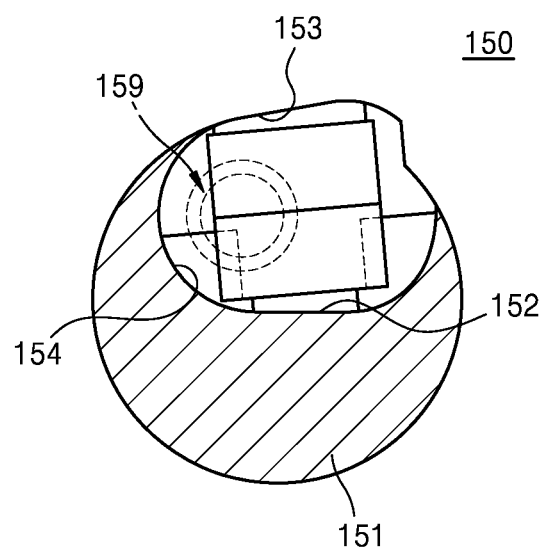
FIG. 7 is a side view illustrating the second driving portion according to one embodiment of the present disclosure.
Figure 8:
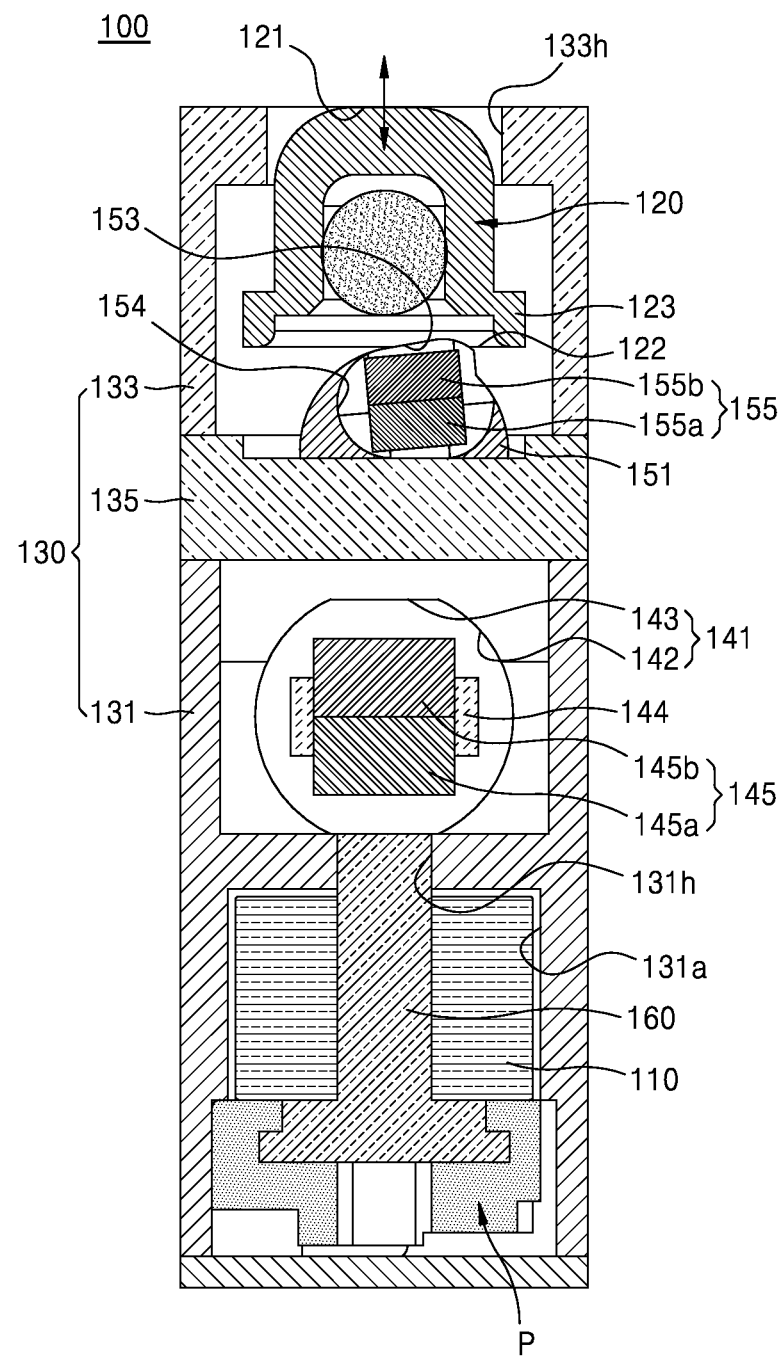
FIG. 8 is a front cross-sectional view illustrating the information output device according to one embodiment of the present disclosure.
Figure 9:
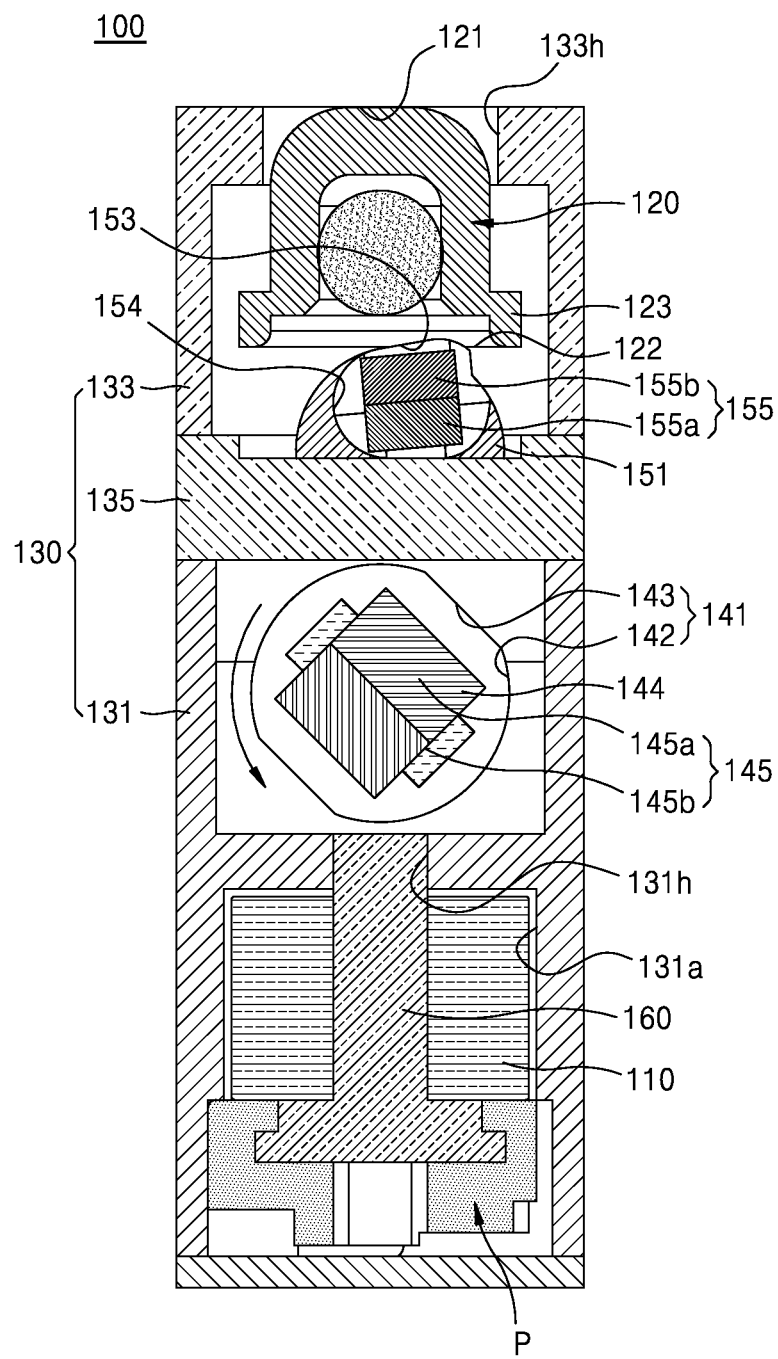
FIGS. 9 to 11 are views illustrating use states of the information output device according to one embodiment of the present disclosure.
Figure 10:
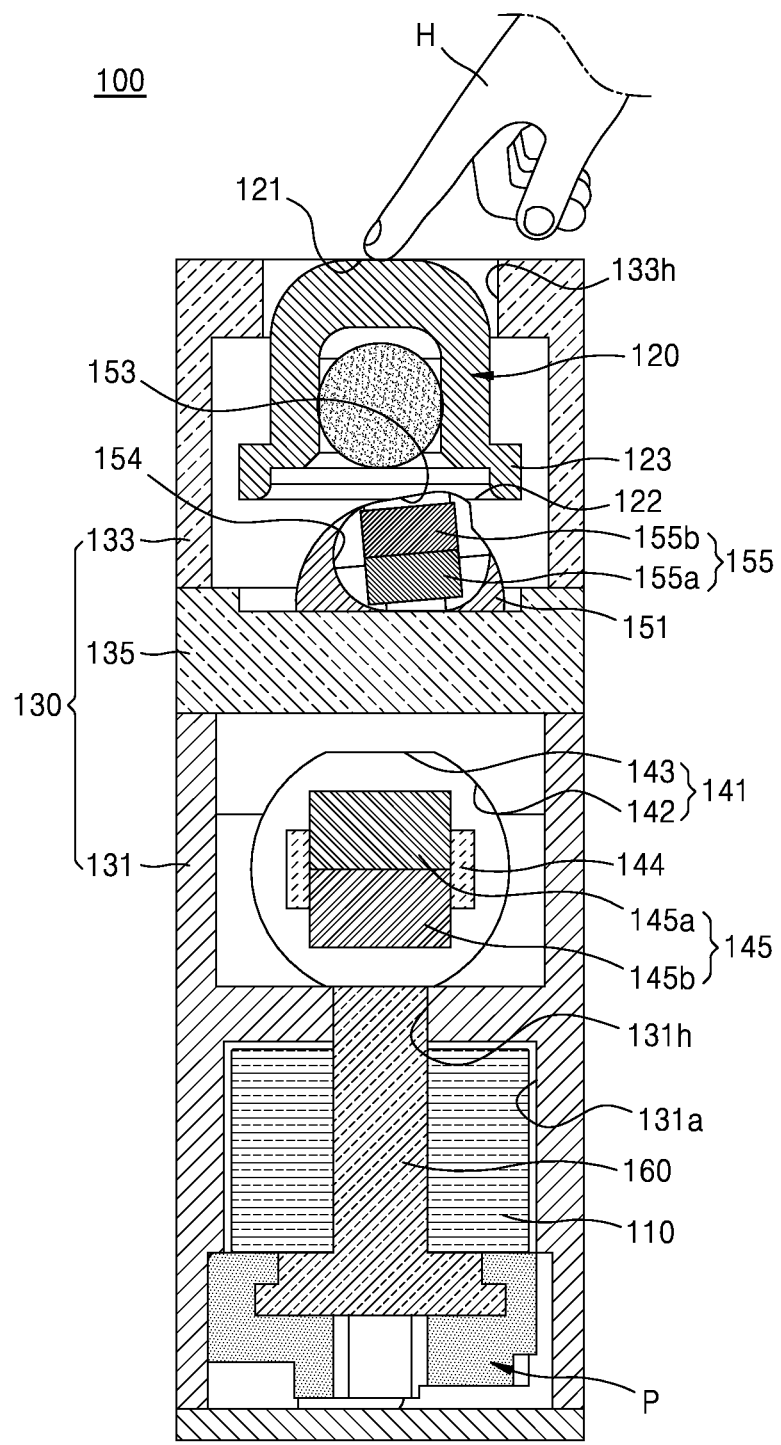
Figure 11:
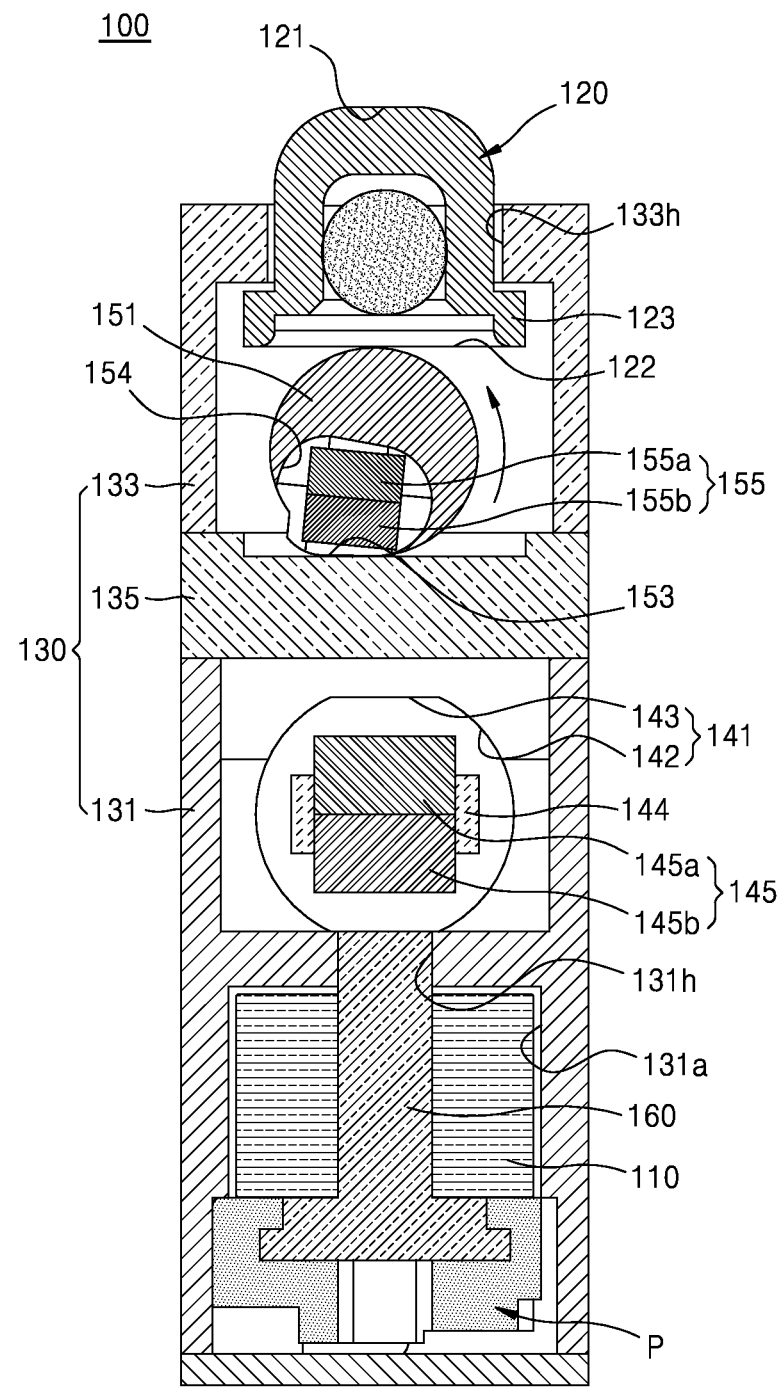
Figure 13:
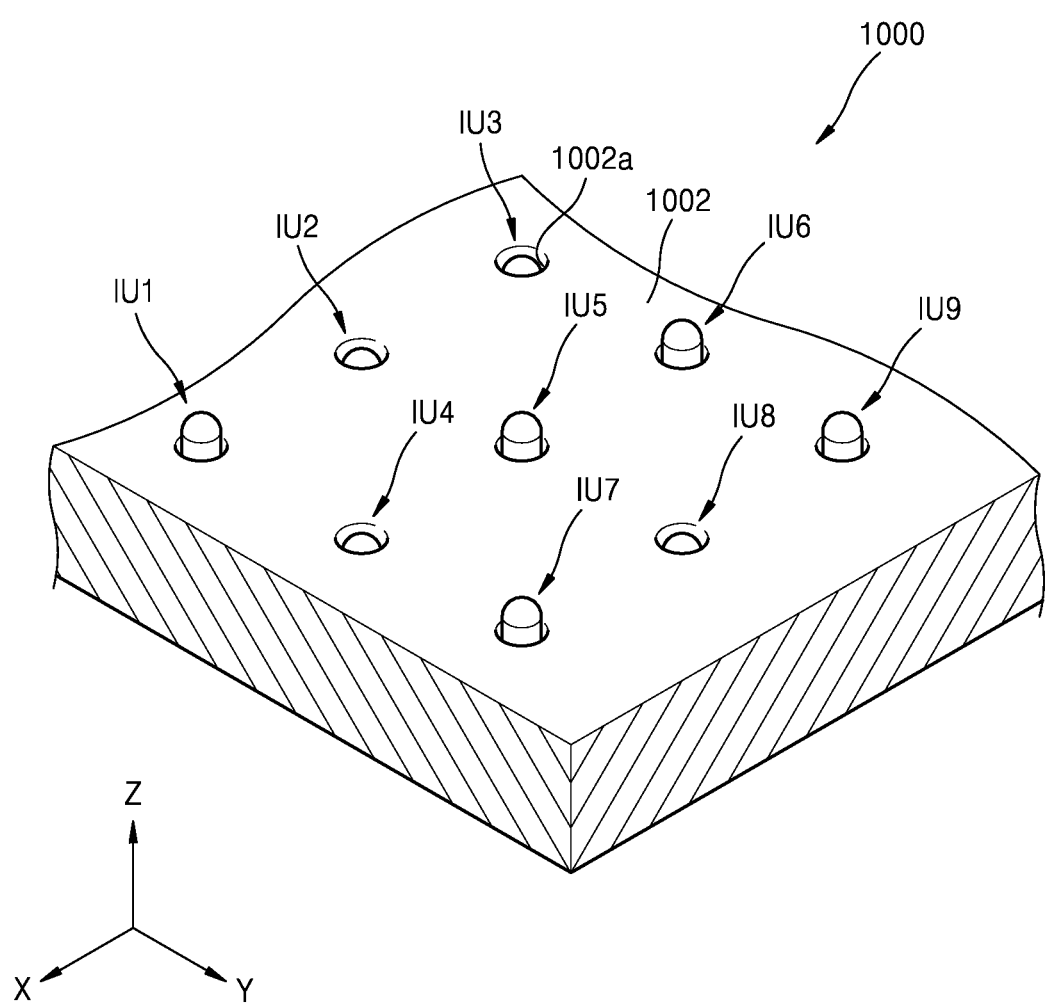
FIG. 13 is a perspective view illustrating an information output device according to one embodiment of the present disclosure.

FIG. 1 is a cross-sectional perspective view illustrating an information output device according to one embodiment of the present disclosure. FIG. 2 is a perspective view illustrating the information output device according to one embodiment of the present disclosure. FIG. 3 is a perspective view illustrating a first accommodating portion and a first driving portion according to one embodiment of the present disclosure. FIG. 4 is a perspective view illustrating the first accommodating portion according to one embodiment of the present disclosure. FIG. 5 is a perspective view illustrating a third accommodating portion according to one embodiment of the present disclosure. FIG. 6 is a perspective view illustrating a second driving portion according to one embodiment of the present disclosure. FIG. 7 is a side view illustrating the second driving portion according to one embodiment of the present disclosure. FIG. 8 is a front cross-sectional view illustrating the information output device according to one embodiment of the present disclosure. FIGS. 9 to 11 are views illustrating use states of the information output device according to one embodiment of the present disclosure. FIG. 13 is a perspective view illustrating an information output device according to one embodiment of the present disclosure.

Referring to FIGS. 1, 2, and 8, an information output device 100 according to one embodiment of the present disclosure includes one or more information output units, and FIG. 1 illustrates one information output unit. That is, the information output device 100 of FIG. 1 may be one information output unit.

Although one information output unit is illustrated in FIG. 1, as an optional embodiment, the information output device 100 may include two or more information output units as shown in FIG. 13.

Referring to FIG. 13, an information output device 1000 according to one embodiment of the present disclosure may include a housing 1002 in which a plurality of via holes 1002*a* are formed, and a plurality of information output units IU1, IU2, IU3, IU4, IU5, IU6, IU7, IU8, and IU9 may be installed to correspond to the plurality of via holes 1002*a*.

That is, the information output device 1000 may include various numbers of information output units IU1, IU2, IU3, IU4, IU5, IU6, IU7, IU8, and IU9 according to use, characteristics of application products, and characteristics of a user H.

Hereinafter, for convenience of description, the information output device 100 including one information output unit as shown in FIG. 1 will be described.

Referring to FIG. 1, the information output device 100 according to one embodiment of the present disclosure may include a driving source portion 110, an expression portion 120, a base portion 130, a first driving portion 140, a second driving portion 150, and a support portion 160.

The driving source portion 110 according to one embodiment of the present disclosure may be disposed and connected to a power supply P such that a current flows therein and may be formed of a coil. Since the driving source portion 110 is formed of the coil, when a current flows, a magnetic field may be formed around the driving source portion 110.

The driving source portion 110 may have various forms, may have a form in which a plurality of circuit wires are wound, and may be formed by varying the number of times of winding. The first driving portion 140 and the second driving portion 150 which are to be described below may be driven through a magnetic field generated by a current flowing in the driving source portion 110.

In addition, the first driving portion 140 and the second driving portion 150 are driven, thereby providing a driving force for moving the expression portion 120 in direct or indirect contact with the first driving portion 140 and the second driving portion 150.

Referring to FIGS. 1 and 8, the support portion 160 to be described below may be disposed inside the driving source portion 110 according to one embodiment of the present disclosure.

The support portion 160 according to one embodiment of the present disclosure may include a region formed to be elongated, and may be disposed to pass through the driving source portion 110. As a specific example, the driving source portion 110 formed of the coil may be formed to have a form wound a plurality of times around the region of the support portion 160 formed to be elongated.

Although not shown in the drawings, one end portion of the support portion 160 may be elongated to support the first driving portion 140 to be described below, and the first diving portion 140 may move while being supported by one end portion of the support portion 160.

Referring to FIGS. 1, 4, and 8, the support portion 160 may correspond to a through-hole 131*h* formed in a first accommodating portion 131 and may be disposed to pass through the through-hole 131*h*.

The support portion 160 according to one embodiment of the present disclosure may include a magnetic body. Thus, when a magnetic field is generated through the driving source portion 110, a magnitude of the magnetic field may be increased, and the magnetic field may be efficiently generated to reduce power consumption of the information output device 100 and increase a driving force thereof.

Referring to FIGS. 1, 2, and 8, the expression portion 120 according to one embodiment of the present disclosure may be formed and disposed to be detected by the user H, may be moved according to the movement of the first driving portion 140 and the second driving portion 150, which will be described below, and may be moved upward or downward (see FIG. 8) with respect to at least a longitudinal central axis of the expression portion 120.

Referring to FIG. 8, the expression portion 120 may move in a first direction (to the lower side in FIG. 8) to move toward the driving source portion 110 or may move in a direction opposite to the first direction (see FIG. 8) to move away from the driving source portion 110.

Referring to FIG. 2, the expression portion 120 may be exposed to the outside through an inlet hole 133*h* formed in the second accommodating portion 133 to be described below. Since the expression portion 120 is exposed to the outside, the user H may tactilely or visually detect the movement of the expression portion 120.

Referring to FIGS. 1, 2, and 8, the expression portion 120 according to one embodiment of the present disclosure may include an expression surface 121, a support surface 122, and a circumferential portion 123.

Referring to FIGS. 1, 2, and 8, the expression surface 121 according to one embodiment of the present disclosure may be an outermost region of the expression portion 120, specifically, a region farthest from the driving source portion 110, and may include a region recognized by the user H.

The user H may recognize the expression portion 120 through the entire region of the expression portion 120, but may recognize only the expression surface 121. For example, the user H may detect the movement of the expression portion 120 through contact with the expression surface 121 and may easily detect the movement of the expression portion 120 through visual detection of the expression surface 121.

The expression surface 121 according to one embodiment of the present disclosure may be formed to be convex toward the outside and may include a curved surface. However, the present disclosure is not limited thereto, and the expression surface 12 may include a region having a cylindrical shape, for example, a region a shape that is similar to a cylindrical shape.

Various modifications may be implemented in such a manner that an upper surface (see FIG. 8) of the expression surface 121 according to one embodiment of the present disclosure may be formed to be flat and only corners thereof may be formed to have a certain radius of curvature.

Referring to FIG. 1, the support surface 122 may be a surface facing the second driving portion 150 among regions of the expression portion 120, may constitute a lower region of the expression portion 120, and may be in contact with the second driving portion 150.

The second driving portion 150 may transmit a force to the expression portion 120 through the support surface 122. Specifically, in a state in which a second driving body 151 is in contact with the support surface 122, the support surface 122 may be moved in the first direction (to the upper side in FIG. 8), and the expression surface 121 may be exposed to the outside and thus recognized by the user H.

Referring to FIGS. 1 and 8, the circumferential portion 123 according to one embodiment of the present disclosure may be connected to the support surface 122 and may be formed to have the relatively longest length from the longitudinal central axis of the expression portion 120.

Specifically, an outer diameter of the circumferential portion 123 may be greater than an inner diameter of the inlet hole 133h formed in the second accommodating portion 133. Therefore, the expression portion 120 disposed inside the second accommodating portion 133, specifically, the circumferential portion 123, may be prevented from passing through the inlet hole 133h to be separated to the outside.

The expression portion 120 according to one embodiment of the present disclosure may be formed of various materials and may be formed of an insulating material as a light and durable material. Specifically, the expression portion 120 may include a resin-based organic material and may include an inorganic material such as a ceramic material.

However, the present disclosure is not limited thereto, and various modifications may be implemented in such a manner that the expression portion 120 may be formed of a material such as metal or glass.

Referring to FIGS. 1 and 2, the base portion 130 according to one embodiment of the present disclosure may be for accommodating the driving source portion 110 and the expression portion 120 and may include the first accommodating portion 131, a second accommodating portion 133, and a third accommodating portion 135.

The base portion 130 according to one embodiment of the present disclosure may have a shape elongated to accommodate the driving source portion 110, the first driving portion 140, and the second driving portion 150 and may be formed to entirely surround all of the driving source portion 110, the first driving portion 140, and the second driving portion 150.

Referring to FIGS. 1 to 4 and 8, the first accommodating portion 131 according to one embodiment of the present disclosure may be for accommodating the driving source portion 110 and the first driving portion 140, and the driving source portion 110 and the support portion 160 may be disposed at one side (lower side in FIG. 1) of the first accommodating portion 131.

Referring to FIGS. 1, 4, and 8, a layer portion (not denoted by reference numeral) in which the through-hole 131h is formed may be disposed at a preset height of the first accommodating portion 131 according to one embodiment of the present disclosure. The driving source portion 110 and the support portion 160 may be disposed in a space formed by the layer portion and an inner wall 131a of the first accommodating portion 131.

A locking groove 131b may be formed at an upper side (see FIG. 1) with respect to the layer portion formed in the first accommodating portion 131, and the first driving portion 140 may be hung in the locking groove 131b and may perform angular movement or rotational movement.

Referring to FIGS. 1, 2, and 8, the second accommodating portion 133 according to one embodiment of the present disclosure may be disposed to face the first accommodating portion 131 and may be for accommodating the expression portion 120. The inlet hole 133h may be formed in one surface of the second accommodating portion 133 facing the expression surface 121 such that the expression portion 120, specifically, the expression surface 121, protrudes to pass therethrough and is exposed to the outside.

The first accommodating portion 131 and the second accommodating portion 133 according to one embodiment of the present disclosure may be disposed adjacent to each other and may be disposed not to overlap each other.

Referring to FIGS. 1 and 8, the third accommodating portion 135 may be disposed between the first accommodating portion 131 and the second accommodating portion 133 according to one embodiment of the present disclosure, and preset regions of the first driving portion 140 and the second driving portion 150 may be disposed in the third accommodating portion 135.

Referring to FIG. 1, the third accommodating portion 135 may cover a pair of locking grooves 131b formed in the first accommodating portion 131 to face each other and may prevent the first driving portion 140 seated in the locking grooves 131b from deviating therefrom.

Referring to FIG. 1, a groove is formed at a lower end portion of the second accommodating portion 133 (see FIG. 1), and when the second accommodating portion 133 is disposed on the third accommodating portion 135 to cover the third accommodating portion 135, the second driving portion 150 is rotatably seated in the groove. Since the second accommodating portion 133 and the third accommodating portion 135 are coupled, it is possible to prevent the second driving portion 150 from being separated.

In addition, since the second accommodating portion 133 and the third accommodating portion 135 are connected, a longitudinal central axis of the second driving portion 150 may be maintained, and since the second accommodating portion 133 and the first accommodating portion 131 are connected, a longitudinal central axis of the first driving portion 140 may be maintained.

Referring to FIGS. 1, 2, 5, and 8, one side (upper side in FIG. 2) of the third accommodating portion 135 according to one embodiment of the present disclosure may be connected to the second accommodating portion 133, and the first accommodating portion 131 may be connected to the other side (lower side in FIG. 2) opposite to the one side.

Referring to FIGS. 1 and 5, the second driving portion 150 to be described below may be disposed in the third accommodating portion 135 according to one embodiment of the present disclosure, and a driving support 136 and driving grooves 137 may be provided in the third accommodating portion 135.

Referring to FIG. 5, the third accommodating portion 135 may have an open upper side and an open lower side, and the driving groove 137 may be formed therein. The driving support 136 connects facing inner walls of the third accommodating portion 135 which is open, and the driving support 136 may be integrally formed with the third accommodating portion 135.

Referring to FIGS. 1 and 5, the second driving portion 150 to be described below, specifically, a first movement region 152, a second movement region 153, and a connection region 154 may be in surface contact with the driving support 136 provided in the third accommodating portion 135 according to one embodiment of the present disclosure invention. The second driving portion 150 may be rotated around a rotational central axis of the second driving portion 150.

In addition, due to the driving grooves 137 formed at both sides of the driving support 136 inside the third accommodating portion 135, a rotation path of the second driving portion 150, specifically, a rotation path of the second driving body 151, may be provided.

A rotational center of the second driving portion 150, specifically, a rotational center of the second driving body 151 is formed at a point deviating from a center of the second driving body 151, and due to the eccentric rotational center of the second driving body 151, as the first movement region 152, the second movement region 153, and the connection region 154, to which a position of a second magnetic force portion 155 to be described below is fixed, are rotated, the second driving body 151 comes into contact with the expression portion 120 to move the expression portion 120 in the first direction (upper side in FIG. 8).

Referring to FIGS. 1, 3, and 8, the first driving portion 140 according to one embodiment of the present disclosure may be disposed inside the base portion 130, specifically, the first accommodating portion 131 and the third accommodating portion 135, and may include a first driving body 141, a magnet holder 144, a first magnetic force portion 145, and a first driving control portion 149.

The first driving portion 140 may be spaced apart from the driving source portion 110 disposed in the first accommodating portion 131. The first driving portion 140 may be disposed adjacent to the driving source portion 110 and may be driven by a current flowing in the driving source portion 110 to perform angular movement or rotational movement.

The movement of the first driving portion 140 may be transmitted to the second driving portion 150, and when the second driving portion 150 receives power from the first driving portion 140 to perform angular movement or rotational movement, the expression portion 120 is lifted or lowered to move in the first direction toward the driving source portion 110 (to the lower side in FIG. 8) and in a direction opposite to the first direction.

Referring to FIGS. 1 and 3, the first driving control portion 149 may be formed to protrude from each of both sides of the first driving portion 140 and may be seated in the locking groove 131b formed in the first accommodating portion 131. Thus, the first driving portion 140 may be stably seated in the first accommodating portion 131 and may be rotated clockwise or counterclockwise in the first accommodating portion 131.

A driving position of the first driving portion 140 may be controlled through the first driving control portion 149 according to one embodiment of the present disclosure. Specifically, when the first driving portion 140 is moved by the driving source portion 110, the first driving portion 140 may perform angular movement or rotational movement around the first driving control portion 149.

As an optional embodiment, a central axis of the first driving portion 140 and the first driving control portion 149 may not coincide with each other and may be eccentric.

As an optional embodiment, the first driving control portion 149 may not be formed to protrude, and the first driving body 141 may be formed in a spherical shape.

Referring to FIGS. 3 and 8, the first driving body 141 according to one embodiment of the present disclosure may include a flat portion 143 and a curved portion 142, and since the flat portion 143 is formed in a preset section, polarities formed in the first magnetic force portion 145 may be correctly and vertically arranged (see FIG. 8).

Referring to FIGS. 1 and 3, a pair of first driving bodies 141 may be provided with respect to a center of the first driving portion 140 according to one embodiment of the present disclosure invention, the magnet holder 144 may be positioned between the pair of first driving bodies 141, and the first magnetic force portion 145 may be accommodated in the magnet holder 144.

The first magnetic force portion 145 according to one embodiment of the present disclosure may include a magnetic material and may include, for example, a permanent magnet. The first magnetic force portion 145 may have a relatively greater magnetic force than the second magnetic force portion 155 provided in the second driving portion 150 to be described below.

As a result, an external force applied by the user H may be applied to the expression portion 120, and in a situation in which the second driving portion 150 may not rotate, after the external force applied to the expression portion 120 is removed, the second magnetic force portion 155 and the second driving portion 150 in which the second magnetic force portion 155 is disposed may be rotated by a magnetic force of the first magnetic force portion 145 to move the expression portion 120 in the first direction and a direction opposite to the first direction.

That is, even when power of a power supply P, which is provided for a relatively short time, is not transmitted to the second driving portion 150 through the first driving portion 140 due to an external force applied to the expression portion 120, the first driving portion 140 may perform angular movement or rotational movement so as to have polarity in a preset direction by power transmitted from the driving source portion 110, and when the external force applied to the expression portion 20 is removed, the second driving portion 150 may perform angular movement or rotational movement by the first driving portion 140.

The first magnetic force portion 145 according to one embodiment of the present disclosure may have a first magnetic region (N pole or S pole) and a second magnetic region (S pole or N pole) having different polarities. During rotation of the first driving portion 140, the first magnetic region 145a and the second magnetic region 145b having different polarities may be arranged at one point in a direction from the driving source portion 110 toward the expression portion 120, for example, in a Z-axis direction (see FIG. 1).

Referring to FIGS. 1, 6, 7, and 8, the second driving portion 150 according to one embodiment of the present disclosure may be disposed between the first driving portion 140 and the expression portion 120. The second driving portion 150 may perform angular movement or rotational movement according to the driving of the first driving portion 140 and may be formed to move the expression portion 120 in the first direction (to the lower side in FIG. 8) toward the first driving portion 140 and a direction (to the upper side in FIG. 8) opposite to the first direction.

Referring to FIGS. 1, 6, 7, and 8, the second driving portion 150 according to one embodiment of the present disclosure may include the second driving body 151, and one surface of the second driving body 151 may support to the expression portion 120 to provide a driving force for the vertical movement of the expression portion 120.

One surface of the second driving body 151 according to one embodiment of the present disclosure may include a curved surface, and as a more specific embodiment, may include a boundary line similar to a circular shape.

As a result, while the second driving portion 150 and the second driving body 151 move, an outer surface of the second driving body 151 may transmit power to the expression portion 120, specifically, the support surface 122 so that the expression portion 120 may move in the first direction (to the lower side in FIG. 1) toward the first driving portion and in a direction (to the upper side in FIG. 1) opposite to the first direction.

Various modifications may be implemented in such a manner that the second driving body 151 according to one embodiment of the present disclosure may have a shape similar to that of a rotating body or may have a shape similar to that of a disk.

As a result, during angular movement or rotational movement of the second driving body 151, a natural driving force may be provided to the support surface 122 of the expression portion 120 to allow the expression portion 20 to efficiently perform natural movement.

Referring to FIGS. 1, 6, 7, and 8, the second driving portion 150 according to one embodiment of the present disclosure may include second driving control portions 159. A position of the second driving portion 150 may be controlled through the second driving control portion 159, and when the second driving portion 150 receives power from the first driving portion 140 to move, the second driving portion 150 may perform angular movement or rotational movement around the second driving control portion 159.

Referring to FIGS. 6 and 7, the second driving portion 150 according to one embodiment of the present disclosure may rotate clockwise or counterclockwise using the second driving control portion 159 as a rotational center.

Referring to FIG. 1, the second driving control portion 159 may be hung on one end portion (upper end portion in FIG. 1) of the third accommodating portion 135, may cover the third accommodating portion 135, and may be positioned inside a groove (not denoted by reference numeral) formed at one end portion (lower end portion in FIG. 1) of the second accommodating portion 133.

However, the present disclosure is not limited thereto, and various modifications may be implemented in such a manner that a groove is formed at one end portion (upper end portion in FIG. 1) of the third accommodating portion 135, the second accommodating portion 133 covers the third accommodating portion 135, and the second driving control portion 159 is positioned inside the groove.

Referring to FIG. 6, the second driving control portion 159 according to one embodiment of the present disclosure may be provided to protrude outward from an outer surface of the second driving body 151. The second driving control portion 159 may be disposed on at least one side surface of the second driving body 151.

Referring to FIGS. 1, 6, 7, and 8, a connection portion according to one embodiment of the present disclosure may be connected to the first driving body 141, and the second magnetic force portion 155 may be accommodated therein.

Referring to FIG. 6, the second driving portion 150 according to one embodiment of the present disclosure may include a pair of second driving bodies 151. A separation space SA may be formed between the pair of second driving bodies 151, and the connection portion (not denoted by reference numeral) may be disposed in the separation space.

In the present disclosure, the connection portion may include the first movement region 152, the second movement region 153, and the connection region 154, and the first movement region 152, the second movement region 153, and the connection region 154 may be formed along a circumference of an outer circumferential surface of the connection portion.

The second magnetic force portion 155 may be accommodated in the connection portion according to one embodiment of the present disclosure. The second magnetic force portion 155 may include a magnetic material and may include, for example, a permanent magnet. The second magnetic force portion 155 may have a relatively smaller magnetic force than the first magnetic force portion 145.

As a result, a magnetic region formed in the second magnetic force portion 155 may be changed by a magnetic force of the first magnetic force portion 145, and the second driving portion 150 in which the second magnetic force portion 155 is accommodated may be moved. However, due to a magnetic force of the second magnetic force portion 155, a magnetic region formed in the first magnetic force portion 145 may be prevented from being changed.

In other words, an external force applied by the user H may be applied to the expression portion 120, and in a situation in which the second driving portion 150 may not rotate, after the external force applied to the expression portion 120 is removed, the second magnetic force portion 155 and the second driving portion 150 in which the second magnetic force portion 155 is disposed may be rotated by a magnetic force of the first magnetic force portion 145 to move the expression portion 120 in the first direction and a direction opposite to the first direction.

That is, even when power of the power supply P, which is provided for a relatively short time, is not transmitted to the second driving portion 150 through the first driving portion 140 due to an external force applied to the expression portion 120, the first driving portion 140 may perform angular movement or rotational movement so as to have polarity in a preset direction by power transmitted from the driving source portion 110, and when the external force applied to the expression portion 120 is removed, the second driving portion 150 may perform angular movement or rotational movement by the first driving portion 140.

The second magnetic force portion 155 according to one embodiment of the present disclosure may have a first magnetic region (N pole or S pole) and a second magnetic region (S pole or N pole) having different polarities. During rotation of the first driving portion 140, the first magnetic region and the second magnetic region having different polarities may be arranged at one point in a direction from the driving source portion 110 toward the expression portion 120, for example, in the Z-axis direction (see FIG. 1).

The second magnetic force portion 155 according to one embodiment of the present disclosure does not coincide with a central axis of the second driving portion 150, specifically, a central axis of the second driving body 151, and may be disposed to overlap, for example, one region of the second driving control portion 159.

Thus, a torque force for the second driving portion 150 may be easily generated, and the second driving portion 150 may be allowed to perform angular movement or rotational movement so that the movement of the expression portion 120 may be efficiently performed and the precise expression power of the information output device 100 may be improved.

In addition, the torque force for the second driving portion 150 may be easily generated, thereby reducing power consumption of the information output device 100.

The second driving portion 150 according to one embodiment of the present disclosure may be driven by receiving power from the first driving portion 140 receiving power from the driving source portion 110. Specifically, the second driving portion 150 may be moved by a magnetic field generated by the first driving portion 140.

That is, the second driving portion 150 may be moved due to a repulsive force and an attractive force acting on the second driving portion 150, specifically, the second magnetic force portion 155 accommodated in the connection portion. The first driving portion 140, specifically, the first magnetic force portion 145 accommodated in the magnet holder 144, may be moved by a magnetic field generated by the driving source portion 110, and as the first magnetic force portion 145 is moved, the second magnetic force portion 155 of the second driving portion 150 may be moved.

Referring to FIGS. 1, 6, 7, and 8, the separation space SA may be formed between the pair of second driving bodies 151 facing each other in the second driving portion 150 according to one embodiment of the present disclosure, the connection portion may be disposed in the separation space, and the first movement region 152, the second movement region 153, and the connection region 154 may be formed along the circumference of the outer circumferential surface of the connection portion.

The first movement region 152 and the second movement region 153 may be regions serving as reference points for a lowest point and a highest point during the movement of the second driving portion 150, respectively. The connection region 154 may be formed between the first movement region 152 and the second movement region 153 and may include a curved surface.

Referring to FIGS. 8 to 11, when the first movement region 152 according to one embodiment of the present disclosure is disposed at an uppermost portion, that is, a region farthest from the first driving portion 140, the second driving portion 150 may be placed at the highest point, and accordingly, the expression portion 120 may be also placed at the highest point, specifically, a height by which the expression portion 120 protrudes from the base portion 130 may be the highest. In this case, the connection region 154 or the second movement region 153 may be supported by the driving support 136 formed in the third accommodating portion 135.

On the other hand, when the second movement region 153 according to one embodiment of the present disclosure is disposed at an uppermost portion, that is, a region farthest from the first driving portion 140, the second driving portion 150 may be placed at the lowest point, and accordingly, the expression portion 120 may be also placed at the lowest point, specifically, a height by which the expression portion 120 protrudes from the base portion 130 may be the lowest. In this case, the connection region 154 or the first movement region 152 may be supported by the driving support 136 formed in the third accommodating portion 135.

Referring to FIG. 7, a distance from a rotational center of the second driving portion 150 to one end portion (lower end portion in FIG. 7) of the second driving body 151 positioned in a lateral direction of the first movement region 152 may be longer than a distance from the rotational center of the second driving portion 150 to the other end portion (upper end portion in FIG. 7) of the second driving body 151 positioned at a side of the second movement region 153.

Accordingly, as the first movement region 152 or the second movement region 153 is supported by the driving support 136, a position of the second driving portion 150 may be positioned at the lowest point or highest point.

The first movement region 152 and the second movement region 153 may be formed to be flat and may be in surface contact with the driving support 136 formed in the third accommodating portion 135. Since the first movement region 152 and the second movement region 153 are in surface contact with the driving support 136, the position of the second driving portion 150 may be stably maintained, and a position of the expression portion 120, which receives power from the second driving portion 150 to move so that the position thereof is changed, may also be stably maintained.

Referring to FIGS. 6 and 7, since the connection region 154 according to one embodiment of the present disclosure may be formed to have a curved shape, during rotation of the second driving portion 150, the second driving portion 150 may stably perform angular movement or rotational movement, and the position of the second driving portion 150 and the position of the expression portion 120 may be finely adjusted according to power received from the first driving portion 140.

Referring to FIGS. 1 and 8, the support portion 60 may be disposed inside the driving source portion 110 according to one embodiment of the present disclosure.

The support portion 160 according to one embodiment of the present disclosure may include the region formed to be elongated, and may be disposed to pass through the driving source portion 110. As a specific example, the driving source portion 110 formed of the coil may be formed to have a form wound a plurality of times around the region of the support portion 160 formed to be elongated.

Referring to FIGS. 1, 4, and 8, the support portion 160 may correspond to the through-hole 131h formed in the first accommodating portion 131 and may be disposed to pass through the through-hole 131h.

The support portion 160 according to one embodiment of the present disclosure may include the magnetic body. Thus, when a magnetic field is generated through the driving source portion 110, a magnitude of the magnetic field may be increased, and the magnetic field may be efficiently generated to reduce power consumption of the information output device 100 and increase a driving force thereof.

The operating principle and effect of the information output device 100 according to one embodiment of the present disclosure as described above will be described.

Referring to FIGS. 1 to 11, the information output device 100 according to one embodiment of the present disclosure may include the driving source portion 110, the expression portion 120, the base portion 130, the first driving portion 140, the second driving portion 150, and the support portion 160.

Referring to FIGS. 8 to 11, the driving source portion 110 according to one embodiment of the present disclosure may be formed of the coil, and when a current is applied from the power supply P, a magnetic field may be formed. A repulsive force or attractive force may act on the first driving portion 140 by a magnetic field formed in the driving source portion 110.

Referring to FIG. 8, a regular position state of the information output device 100 is shown, and when a current is applied to the driving source portion 110, a magnetic field is formed. When a repulsive force is applied to the first magnetic force portion 145, specifically, the first magnetic region 145a, tends to move to a position far away from the driving source portion 110, and the second magnetic region 145b moves to a position close to the driving source portion 110 by an attractive force.

The movement of the first magnetic force portion 145 moves the first driving portion 140 in which the first magnetic force portion 145 is accommodated.

Referring to FIGS. 1 and 8, the first driving portion 140, specifically, the first driving body 141, may include the curved portion 142 and the flat portion 143 formed along a circumference of an outer circumferential surface, and the first driving portion 140 may be stably rotated by the curved portion 142. When a position of the first magnetic portion 145 accommodated in the magnet holder 144 is shifted to the final position as the first magnetic region 145a and the second magnetic region 145b are moved, the flat portion 143 may come into surface contact with one surface of the first accommodating portion 131 facing the flat portion 143 and may stably maintain a position.

After the movement of the first driving portion 140 is completed, the first driving portion 140 transmits power to the second driving portion 150 to allow the second driving portion 150 to perform angular movement or rotational movement. The second driving portion 150 according to one embodiment of the present disclosure may be moved by receiving power from the first driving portion 140 and may be moved by a repulsive force or an attractive force with the first driving portion 140.

When the first driving portion 140, specifically, the first magnetic region 145*a* of the first magnetic force portion 145 accommodated in the magnet holder 144, receives power from the driving source portion 110 to be disposed on the second magnetic region 145*b*, the second driving portion 150 on which an attractive force with the first magnetic region 145*a* acts, specifically, a second magnetic region 155*b* of the second magnetic force portion 155, is moved and disposed close to the first driving portion 140.

The movement of the second magnetic force portion 155 causes the second driving portion 150 to move using the second driving control portion 159 as a rotational center. In this case, the second movement region 153 may be moved to a position close to the first driving portion 140 and may be supported by the driving support 136 formed in the third accommodating portion 135.

Since a distance from the rotational center to the first movement region 152 is longer than a distance from the rotational center to the second movement region 153 of the second driving body 151, when the first movement region 152 faces the expression portion 120, specifically, the support surface 122, the second driving body 151 may support and push the support surface 122 of the expression portion 120 upward (see FIG. 8).

So far, the operation of the information output device 100 has been described in a situation in which an external force is not applied to the expression portion 120, and referring to FIGS. 9 to 11, an operation when an external force is applied to the expression portion 120 will be described.

Referring to FIG. 9, positions of the first magnetic region 145*a* and the second magnetic region 145*b* of the first magnetic force portion 145 are changed by the rotation of the first driving portion 140, and as the position of the first magnetic force portion 145 is changed, power is transmitted to the second driving portion 150.

Referring to FIG. 10, a state in which the user H presses the expression portion 120 to apply an external force is shown, and while the first driving portion 140 is moved according to a change in position of the first magnetic force portion 145, the first driving portion 140 has to transmit power to the second magnetic force portion 155, but a situation occurs in which the second magnetic force portion 155 may not move due to the external force applied to the expression portion 120.

Referring to FIG. 11, when the external force applied to the expression portion 120 is removed, the second driving portion 150, specifically, the second magnetic force portion 155, is moved by a magnetic field formed by the first driving portion 140. By an attractive force with the first magnetic region 145*a* positioned at an upper side (see FIG. 11) of the first driving portion 140, the second magnetic region 155*b* of the second magnetic force portion 155 having different polarity from the first magnetic region 145*a* of the first magnetic force portion 145 moves toward the first driving portion 140, and the second driving portion 150 accommodating the second magnetic force portion 155 moves.

That is, a current applied to the driving source portion 110 is applied for a very short time, for example, 7 ms. When a driving portion supporting the expression portion 120 and transmitting power to the expression portion 120 is formed as a single portion, not only when an external force is applied while a current is applied by the driving source portion 110, but even when an external force is removed, there is a problem in that power is no longer transmitted to the driving portion and thus the driving portion may not move.

In the information output device 100 according to one embodiment of the present disclosure, since the first driving portion 140 is moved by a magnetic field generated when a current is applied from the power supply P to the driving source portion 110, and a position of the first magnetic force portion 145 is set, when an external force is applied to the expression portion 120 and the second driving portion 150 supporting the expression portion 120 and then the external force is removed, a position of the second magnetic force portion 155 may be changed, and thus the second driving portion 150 may move to vertically move the expression portion 120 (see FIG. 11).

That is, since the first driving portion 140 and the second driving portion 150 are not in direct contact with each other and are placed in the separate first accommodating portion 131 and the separate third accommodating portion 135, respectively, the first driving portion 140 and the second driving portion 150 may be moved by a magnetic field of the driving source portion 110 without being affected by an external force. When the external force is removed, a position of the second magnetic force portion 155 may be changed by a repulsive force or manpower through the first magnetic force portion 145 of the first driving portion 140 of which a position has already been determined, and as the second driving portion 1500 moves, the expression portion 120 may be vertically moved.

Figure 12:
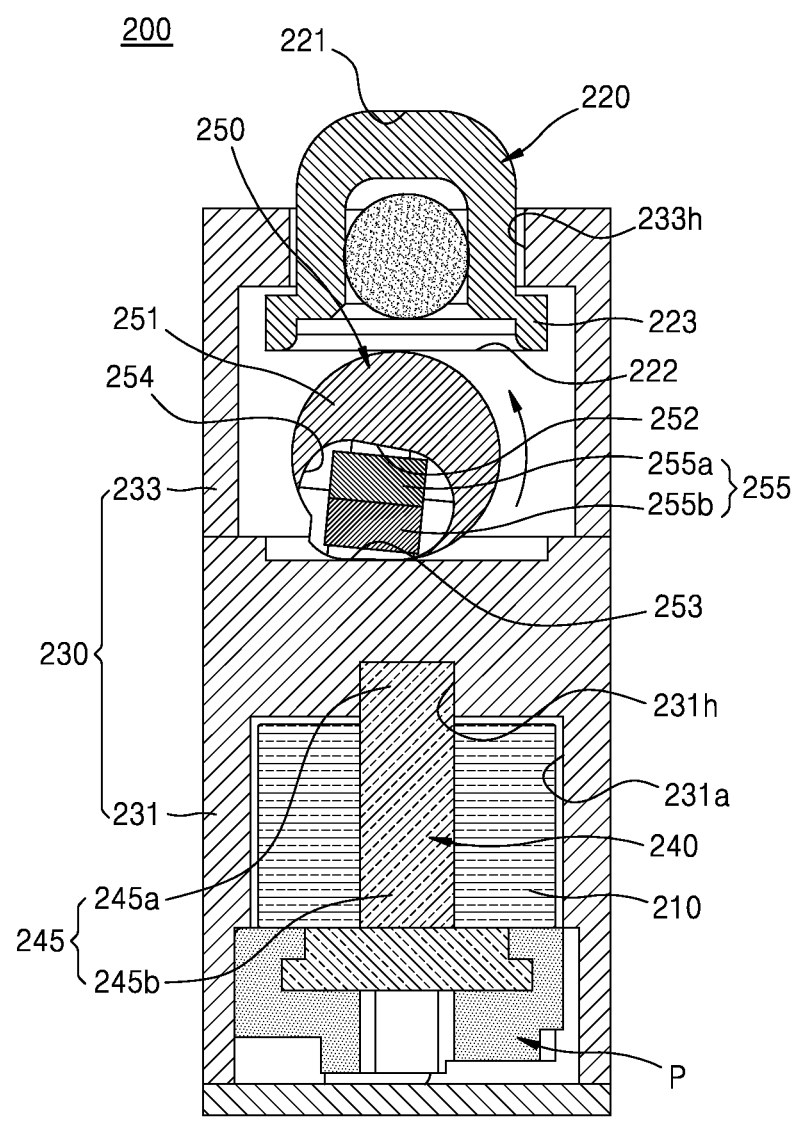
FIG. 12 is a view illustrating an information output device according to another embodiment of the present disclosure.

Hereinafter, the configuration, operating principle, and effect of an information output device 200 according to another embodiment of the present disclosure will be described. FIG. 12 illustrates the information output device according to another embodiment of the present disclosure.

The information output device 200 according to another embodiment of the present disclosure may include a driving source portion 210, an expression portion 220, a base portion 230, a first driving portion 240, and a second driving portion 250.

Referring to FIG. 12, the driving source portion 210 may be connected to a power supply P and disposed such that a current flows and may be disposed outside the first driving portion 240.

As an optional embodiment, the first driving portion 240 may be accommodated in the base portion 230 and may include a first magnetic force portion 245, and the first magnetic force portion 245 may be formed of a permanent magnet, specifically, an alnico magnet.

Referring to FIG. 12, the base portion 230 may include a first accommodating portion 231 and a second accommodating portion 232. The driving source portion 210 and the first driving portion 240 may be accommodated in the first accommodating portion 231, and the second driving portion 250 and the expression portion 220 may be accommodated in the second accommodating portion 233.

Various modifications may be implemented in such a manner that the first accommodating portion 231 and the second accommodating portion 233 may be integrally formed or may be separately formed and connected.

Referring to FIG. 12, the driving source portion 210 may be formed of a coil and may be disposed outside the first magnetic force portion 245 to surround the first magnetic force portion 245.

The driving source portion 210 may be formed of a coil, and when a current is applied to the driving source portion 210, polarities of a first magnetic region 245a and a second magnetic region 245b formed in the first magnetic force portion 245 may be changed.

In the information output device 200 according to another embodiment of the present disclosure, the driving source portion 210 surrounds the first magnetic force portion 245, and the polarity of the first magnetic force portion 245 is changed when a current is applied to the driving source portion 210, but the present disclosure is not limited thereto. Various modifications may be implemented without departing from the technical spirit in such a manner that a current is directly or indirectly applied to the first magnetic force portion and the polarities of the first magnetic region 245a and the second magnetic region 245b may be changed.

Those of the information output device 200 according to another embodiment of the present disclosure are the same as the configuration, the operating principle, and effect of the expression portion 120, the base portion 130, and the second driving portion 150 of the information output device 100 according to one embodiment of the present disclosure except that polarity is changed by the driving source portion 210 while a position of the first driving portion 240, specifically, a position of the first magnetic force portion 245, is maintained, and thus detailed descriptions in an overlapping range will be omitted.

The information output device according to embodiments of the present disclosure may be a visual detecting type information output device in which, when the expression portion protrudes, a user visually detects the expression portion. In particular, when a color is formed on one surface of the expression portion, specifically, an upper surface (see FIG. 1), or one surface of the expression portion is formed to generate light, such a visual effect may be increased.

Thus, the information output device according to embodiments of the present disclosure may output information to a user, and as an optional embodiment, when the information output device includes a plurality of information output units, various types of information may be output to the user.

In addition, the first driving portion may perform angular movement or rotational movement by the driving source portion, and the second driving portion may be moved downward in the first direction toward the first driving source portion or may be moved upward in a direction opposite to the first direction by a magnetic field of the first driving portion.

The first driving portion and the second driving portion according to one embodiment of the present disclosure may rotate while maintaining a certain region by the first driving control portion and the second driving control portion.

An on or off state of the information output device may be easily implemented by lifting and lowering the expression portion.

In addition, even when the second driving parr may not be driven in a state in which an external force is applied to the second driving portion that supports and moves the expression portion, when the external force applied to the second driving portion is removed, the second driving portion may be moved by receiving power from the first driving portion, specifically, the first magnetic force portion, thereby transmitting power to the expression portion.

Due to the driving of the first driving portion and the second driving portion according to one embodiment of the present disclosure, it is possible to easily convert and maintain an on or off state of the expression portion of the information output device, reduce power consumption for the movement of the expression portion, and improve the overall energy efficiency of the information output device.

The first magnetic force portion and the second magnetic force portion provided in the first driving portion and the second driving portion according to one embodiment of the present disclosure may be disposed to overlap the first driving control portion and the second driving control portion. Specifically, a center of the first magnetic force portion may overlap the first driving control portion, and a center of the second magnetic force portion may overlap the second driving control portion.

As a result, when the first driving portion and the second driving portion rotate around the first driving control portion and the second driving control portion, it is possible to minimize a change in relative position between the first magnetic force portion and the second magnetic force portion and a change in relative position between the first magnetic force portion and the driving source portion.

As a result, an influence of a magnetic field generated by the first magnetic force portion and the driving source portion may reduce the non-uniformity of the effects on the second magnetic force portion and the driving source portion and may facilitate the precise control of the movement of the second driving portion.

Hereinafter, the configuration, operating principle, and effect of an information output device according to another embodiment of the present disclosure will be described.

Figure 14:
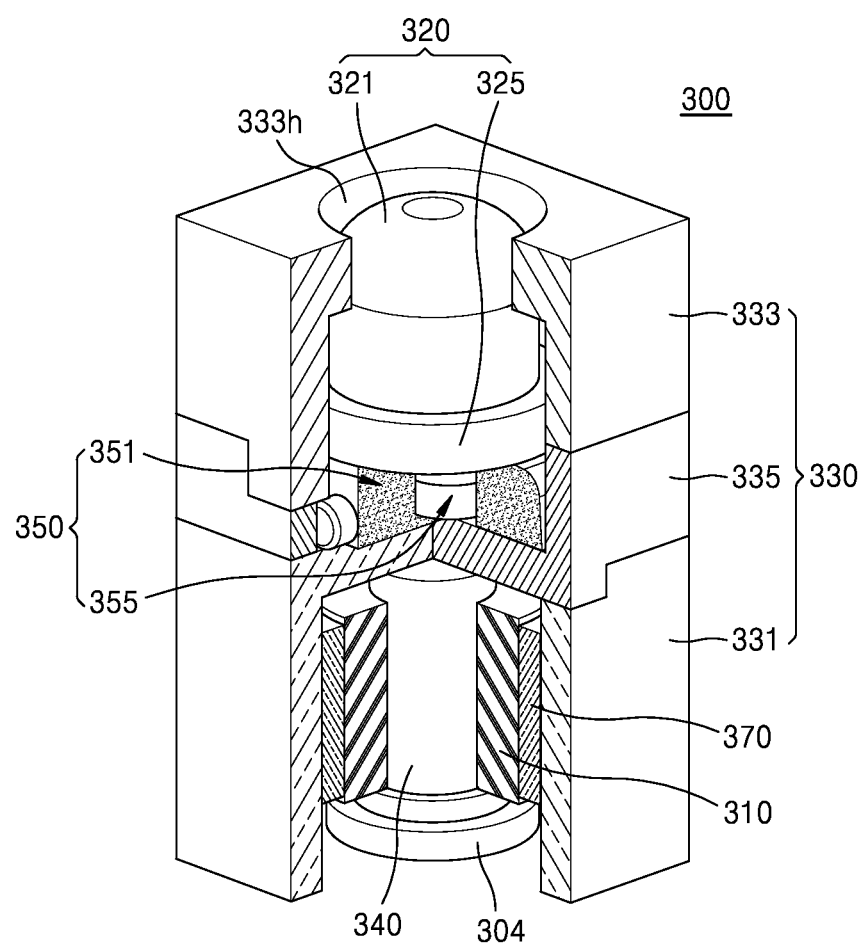
FIG. 14 is a perspective view illustrating an information output unit according to one embodiment of the present disclosure.
Figure 15:
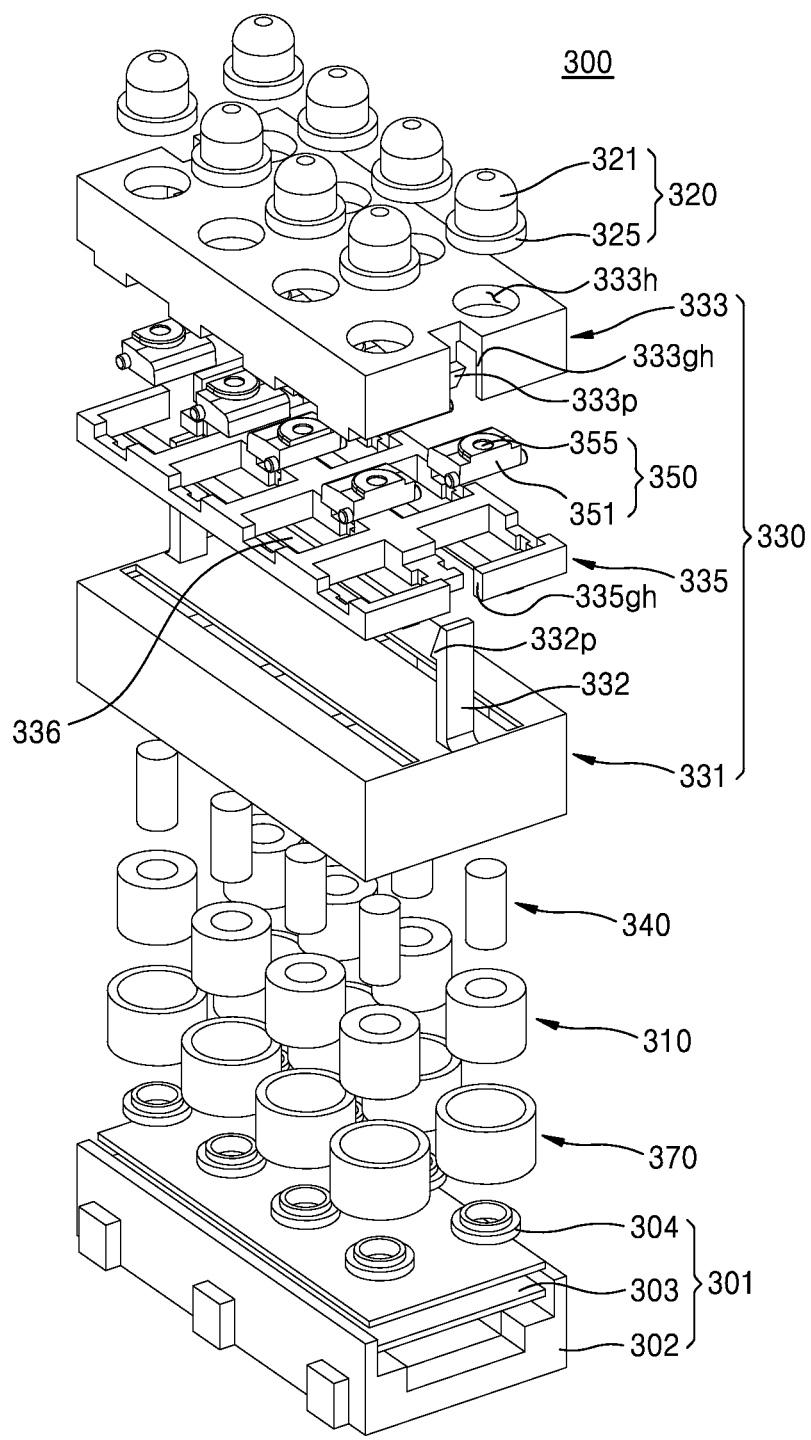
FIG. 15 is an exploded perspective view illustrating a plurality of information output units according to one embodiment of the present disclosure.
Figure 16:
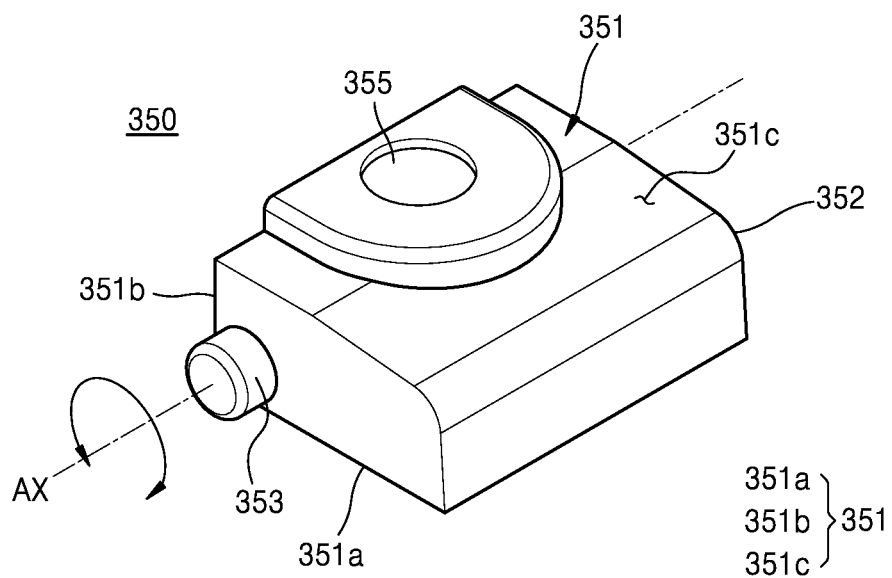
FIG. 16 is a perspective view illustrating a second driving portion according to one embodiment of the present disclosure.

FIG. 14 is a perspective view illustrating an information output unit according to one embodiment of the present disclosure. FIG. 15 is an exploded perspective view illustrating a plurality of information output units according to one embodiment of the present disclosure. FIG. 16 is a perspective view illustrating a second driving portion according to one embodiment of the present disclosure. FIGS. 17 to 20 are views illustrating states in which the information output unit is driven according to one embodiment of the present disclosure.

Referring to FIG. 13, an information output device 1000 according to one embodiment of the present disclosure includes one or more information output units, and FIG. 14 illustrates one information output unit.

Referring to FIG. 15, FIG. 5 partially illustrates the information output device in which the plurality of information output units are disposed, and the plurality of information output units may be connected to each other to form a group.

Referring to FIGS. 13 to 15, the information output device according to one embodiment of the present disclosure includes one or more information output units, and FIG. 14 illustrates one information output unit. That is, the information output device of FIG. 14 may be one information output unit.

FIGS. 14 and 17 to 20 are views mainly illustrating a single information output unit, and hereinafter, for convenience of description, one information output unit 300 (hereinafter referred to as "information output device 300" as shown in FIG. 14 will be described.

Referring to FIGS. 14 and 15 to 17, the information output device 300 according to one embodiment of the present disclosure may include a substrate portion 301, a driving source portion 310, an expression portion 320, a base portion 330, a first driving portion 340, a second driving portion 350, and a shielding portion 370.

Referring to FIG. 15, the substrate portion 301 according to one embodiment of the present disclosure may be electrically connected to a power supply and may include a substrate housing 302, a circuit portion 303, and a contact plate 304.

Referring to FIG. 15, the substrate housing 302 may be connected to the base portion 330 to be described below, and the base portion 330 may be disposed on the substrate housing 302. The circuit portion 303 may be disposed on the substrate housing 302 and may be formed as a printed circuit board (PCB).

Figure 17:
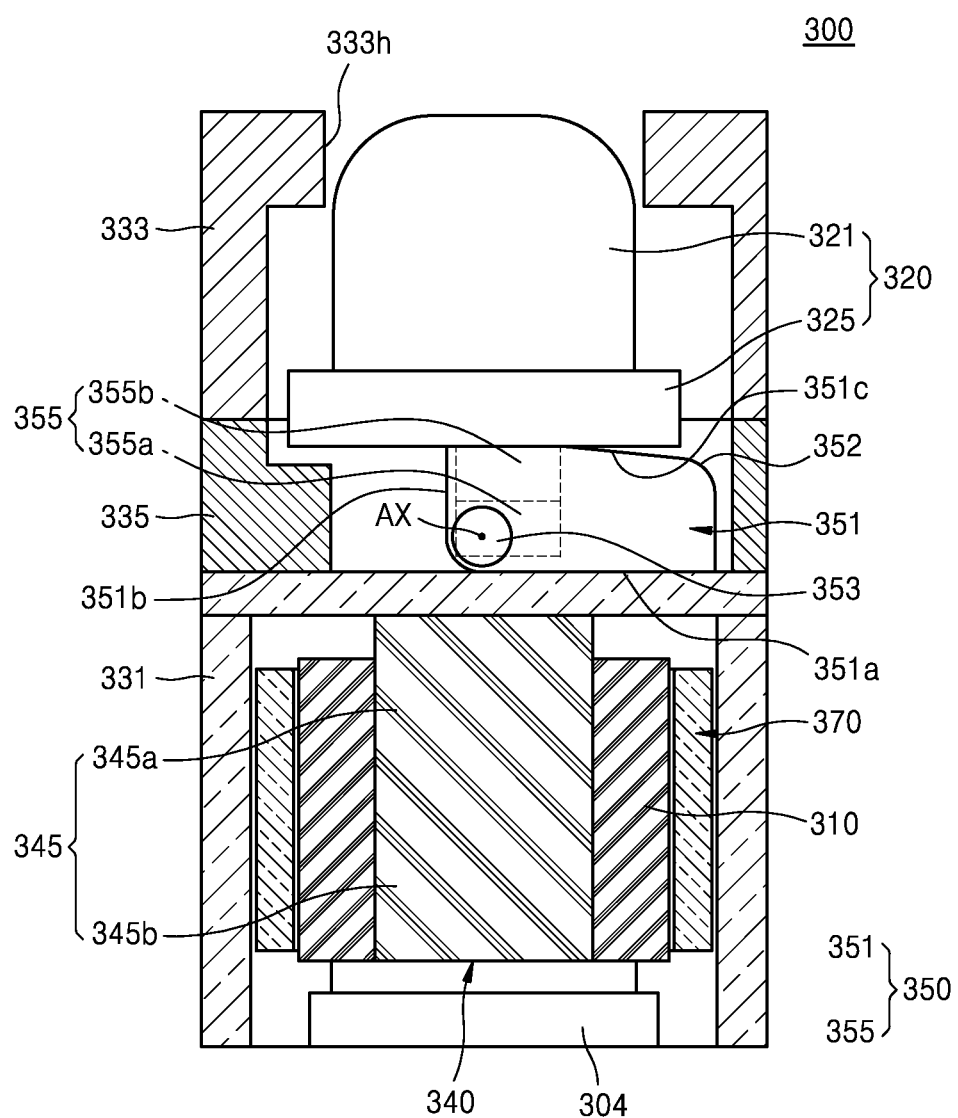
FIGS. 17 to 20 are views illustrating states in which the information output unit is driven according to one embodiment of the present disclosure.

Referring to FIGS. 4, 15, and 17, the contact plate 304 according to one embodiment of the present disclosure may be disposed on the circuit portion 303 and may be disposed between the circuit portion 303 and the driving source portion 310 to be described below.

The contact plate 304 may be formed of a conductive material and may transmit a current received from the circuit portion 303 to the driving source portion 310. The contact plate 304 may be disposed in a state of being in contact with each of the driving source portion 310 and the circuit portion 303.

Referring to FIGS. 14, 15, and 17 to 20, the driving source portion 310 according to one embodiment of the present disclosure may be connected to the substrate portion 301 and disposed such that a current flows and may be formed of a coil.

Since the driving source portion 310 according to one embodiment of the present disclosure is formed of the coil, a magnetic field may be formed around the driving source portion 310 when a current flows.

The driving source portion 310 may have various forms, may have a form in which a plurality of circuit wires are wound, and may be formed by varying the number of times of winding.

Referring to FIGS. 14, 15, and 17 to 20, the driving source portion 310 according to one embodiment of the present disclosure may be formed in a cylindrical shape having open both sides, but this is for convenience of description. As described above, in a state in which a plurality of circuit wires are wound, the driving source portion 310 may have a shape disposed outside the first driving portion 340 to be described below.

The first driving portion 340 to be described below may be driven through a magnetic field generated by a current flowing in the driving source portion 310 according to one embodiment of the present disclosure, and according to the driving of the first driving portion 340, the second driving portion 350 may perform angular movement or rotational movement.

In addition, the first driving portion 340 and the second driving portion 350 are driven, thereby providing a driving force to the expression portion 320 in direct or indirect contact with the first driving portion 340 and the second driving portion 350.

Referring to FIGS. 14, 15, and 17 to 20, the first driving portion 340 to be described below may be disposed inside the driving source portion 310 according to one embodiment of the present disclosure. The driving source portion 310 and the first driving portion 340 may share a longitudinal central axis (vertical direction in FIG. 14).

Referring to FIGS. 14, 15, and 17 to 20, the driving source portion 310 according to one embodiment of the present disclosure may be disposed between the first driving portion 340 and the shielding portion 370 to be described below in a radial direction with respect to a longitudinal central axis.

Since the driving source portion 310 is disposed inside the shielding portion 370, power generated from the outside is transmitted to the driving source portion 310 through the substrate portion 301. Even when a magnetic field is formed in the driving source portion 310, the magnetic field may not affect the driving source portion 310 and the first driving portion 340 provided in another information output device 300 positioned close to one information output device 300.

That is, when a plurality of information output devices 300 are driven, the respective information output devices 300 may be independently driven without affecting the operation thereof.

In addition, since the shielding portion 370 blocks a magnetic field, which is generated from the driving source portion 310 disposed inside the shielding portion 370, from being transmitted to the outside so that the plurality of information output devices 300 disposed close to each other may be independently and precisely driven.

Referring to FIGS. 14, 15, and 17 to 20, the expression portion 320 according to one embodiment of the present disclosure may be formed and disposed to be detected by a user and may be moved in a preset direction according to the driving of the first driving portion 340 and the second driving portion 350 which are to be described below.

The expression portion 320 according to one embodiment of the present disclosure may move upward or downward (see FIG. 14) with respect to a longitudinal central axis thereof.

Referring to FIGS. 14, 15, and 17 to 20, the expression portion 320 according to one embodiment of the present disclosure may move in a first direction (to the lower side in FIG. 17) to move toward the driving source portion 310 or may move in a direction (to the upper side in FIG. 18) opposite to the first direction to move away from the driving source portion 310.

Referring to FIGS. 14, 15, and 17, the expression portion 320 according to one embodiment of the present disclosure may be exposed to the outside through the base portion 330 to be described below, specifically, an inlet hole 333h formed in a second accommodating portion 333.

Since the expression portion 320 is exposed to the outside, a user may tactilely or visually detect the movement of the expression portion 320 using a finger.

Referring to FIGS. 14, 15, and 17, the expression portion 320 according to one embodiment of the present disclosure may include an expression surface 321 and a circumferential surface 325.

Referring to FIGS. 14, 15, and 17, the expression surface 321 may be a region that is relatively far away from the driving source portion 310 among regions of the expression portion 320 and may include a region recognized by a user.

As an optional embodiment, a user may recognize the expression portion 320 through the entire region of the expression portion 320, but may recognize only the expression surface 321.

For example, the user may detect the movement of the expression portion 320 through contact with the expression surface 321, and the user may easily detect the movement of the expression portion 320 through visual detection of the expression surface 321.

Referring to FIGS. 14 and 15, the expression surface 321 according to one embodiment of the present disclosure may be formed to be convex toward the outside and may include a curved surface. However, the present disclosure is not limited thereto, and the expression surface 321 may include a region having a cylindrical shape, as an optional embodiment, a region having a shape that is similar to a cylindrical shape.

Referring to FIG. 14, various modifications may be implemented in such a manner that an upper surface (see FIG. 17) of the expression surface 321 according to one embodiment of the present disclosure may be formed to be flat and only corners formed in a radius direction with respect to the upper surface of the expression surface 321 may be formed to have a certain radius of curvature.

Referring to FIG. 14, the circumferential surface 325 may be a surface facing the second driving portion 350 among regions of the expression portion 320, may constitute a lower region of the expression portion 320, and may be in contact with the second driving portion 350.

The second driving portion 350 may transmit a force to the expression portion 320 through the circumferential surface 325. Specifically, in a state in which a second driving body 351 is in contact with a lower surface (see FIG. 17) of the circumferential surface 325, the circumferential surface 325 may be moved in the first direction (to the upper side in FIG. 18), and the expression surface 321 may be exposed to the outside so that a user may recognize the expression portion 320.

Referring to FIG. 17, the circumferential surface 325 according to one embodiment of the present disclosure may be connected to the expression surface 321 and may be formed to have the relatively longest length in a radial direction from a longitudinal central axis of the expression portion 320.

Referring to FIGS. 15 and 17, the circumferential surface 325 according to one embodiment of the present disclosure may be formed in a disk shape, but the present disclosure is not limited thereto. Various modifications may be implemented without departing from the technical spirit in such a manner that the circumferential surface 325 may be formed in a quadrangular shape having an area that is relatively larger than an area of the inlet hole 333h formed in the base portion 330, specifically, the second accommodating portion 333.

As an optional embodiment, the circumferential surface 325 may be formed in a triangular shape without departing from the technical spirit such that a distance from a center of the circumferential surface 325 to an outer circumferential surface is relatively longer than a distance from a center of the inlet hole 333h formed in the second accommodating portion 333 to an inner circumferential surface.

Since the area of the circumferential surface 325 according to one embodiment of the present disclosure is relatively larger than the area of the inlet hole 333h formed in the second accommodating portion 333, when the expression portion 320 receives power from the second driving portion 350 to move in a direction away from the driving source portion 310, the circumferential surface 325 may be prevented from passing through the inlet hole 333h to be separated to the outside.

The expression portion 320 according to one embodiment of the present disclosure may be formed of various materials and may be formed of an insulating material as a light and durable material. Specifically, the expression portion 320 may include a resin-based organic material and may include an inorganic material such as a ceramic material.

However, the present disclosure is not limited thereto, and various modifications may be implemented in such a manner that the expression portion 320 may be formed of a material such as metal or glass.

Referring to FIGS. 14, 15, and 17 to 20, the base portion 330 according to one embodiment of the present disclosure may be for accommodating the driving source portion 310, the first driving portion 340, the second driving portion 350, and the expression portion 320 and may include a first accommodating portion 331, the second accommodating portion 333, and a third accommodating portion 335.

The base portion 330 according to one embodiment of the present disclosure may have a shape elongated to accommodate the driving source portion 310, the first driving portion 340, the second driving portion 350, and the expression portion 320 and may be formed to entirely surround all of the driving source portion 310, the first driving portion 340, the second driving portion 350, and the expression portion 320.

Referring to FIGS. 14, 15, and 17 to 20, the first accommodating portion 331 according to one embodiment of the present disclosure may for accommodating the driving source portion 310, the first driving portion 340, and the shielding portion 370, one side (upper side in FIG. 15) thereof may be coupled to the third accommodating portion 335, and the other side (lower side in FIG. 15) opposite to the one side may be coupled to the substrate portion 301, specifically, the substrate housing 302.

Referring to FIG. 15, a hole (not denoted by reference numeral) may be formed in an upper surface (see FIG. 15) of the first accommodating portion 331 according to one embodiment of the present disclosure, and the first driving portion 340 and the second driving portion 350 may be disposed to face each other through the hole.

Referring to FIG. 15, a guide portion 332 may be formed to extend upward from the upper surface (see FIG. 15) of the first accommodating portion 331 according to one embodiment of the present disclosure.

The guide portion 332 may pass through a third accommodating guide groove 335gh formed in the third accommodating portion 335 and a second accommodating guide groove 333gh formed in the second accommodating portion 333, and thus the first accommodating portion 331, the second accommodating portion 333, and the third accommodating portion 335 may be aligned and stably coupled in a height direction (vertical direction in FIG. 15).

Referring to FIG. 15, at an outer end portion of the guide portion 332 according to one embodiment of the present disclosure, a hook portion 332p may be form to protrude at a certain angle with respect to a longitudinal direction (vertical direction in FIG. 15) of the guide portion 332.

Since the hook portion 332p is formed to protrude, the hook portion 332p may be coupled to a guide protrusion 333p formed in the second accommodating portion 333 in a hanging manner, and a fastening force between the first accommodating portion 331, the second accommodating portion 333, and the third accommodating portion 335 may be further improved.

Referring to FIGS. 14, 15, and 17 to 20, the second accommodating portion 333 according to one embodiment of the present disclosure may be disposed to face the first accommodating portion 331 and may be for accommodating the expression portion 320, and the inlet hole 333h may be formed in an upper surface (see FIG. 15) thereof such that the expression portion 320, specifically, the expression surface 321, protrudes therefrom and is exposed to the outside.

The first accommodating portion 331 and the second accommodating portion 333 according to one embodiment of the present disclosure may be disposed adjacent to each other and may be disposed not to overlap each other.

Referring to FIGS. 4, 15, and 17, the third accommodating portion 335 may be disposed between the first accommodating portion 331 and the second accommodating portion 333 according to one embodiment of the present disclosure. The second driving portion 350 may be disposed in the third accommodating portion 335 to perform angular movement or rotational movement.

Referring to FIG. 15, at one side of the second accommodating portion 333 according to one embodiment of the present disclosure, the second accommodating guide groove 333gh, into which the guide portion 332 formed in the first accommodating portion 331 may be inserted, may be formed in a groove shape.

When the second accommodating portion 333 moves toward the first accommodating portion 331 so as to be coupled to the first accommodating portion 331, the guide portion 332 formed in the first accommodating portion 331 may be inserted along the second accommodating guide groove 333gh formed in the second accommodating portion 333.

Accordingly, the second accommodating portion 333 may be moved toward the first accommodating portion 331 along a preset coupling path and may be coupled to the third accommodating portion 335 disposed in the first accommodating portion 331.

Referring to FIG. 15, the guide protrusion 333p may protrude outward from the inside of the second accommodating guide groove 333gh formed in the second accommodating portion 333 according to one embodiment of the present disclosure.

Since the guide protrusion 333p protrudes outward from the inside of the second accommodating guide groove 333gh, the hook portion 332p formed on the guide portion 332 may be hung on and coupled to the guide protrusion 333p.

In addition, due to a hanging coupling between the guide protrusion 333p and the hook portion 332p, it is possible to prevent an uncoupling between the first accommodating portion 331 and the second accommodating portion 333 after the first accommodating portion 331 and the second accommodating portion 333 are coupled with the third accommodating portion 335 interposed therebetween.

Referring to FIG. 15, the guide portion 332 formed in the first accommodating portion 331, the second accommodating guide groove 333gh formed in the second accommodating portion 333, the guide protrusion 333p, and the third accommodating guide groove 335gh formed in the third accommodating portion according to one embodiment of the present disclosure are formed at one side of the base portion 330, but the present disclosure is not limited thereto. A pair of guide portions 332, a pair of second accommodating guide grooves 333gh, a pair of guide protrusions 333p, and a pair of third accommodating guide grooves 335gh may be provided and disposed to face each other.

As a result, it is possible to improve a fastening force between the first accommodating portion 331, the second accommodating portion 333, and the third accommodating portion 335.

Referring to FIGS. 14, 15, and 17, the third accommodating portion 335 according to one embodiment of the present disclosure may connect the first accommodating portion 331 and the second accommodating portion 333, and the second driving portion 350 may be disposed therein. The second driving portion 350 may be rotatably disposed in the third accommodating portion 335 according to one embodiment of the present disclosure.

Referring to FIG. 15, the third accommodating guide groove 335gh may be formed in a groove shape at one side of the third accommodating portion 335 according to one embodiment of the present disclosure, and the third accommodating guide groove 335gh may be formed to communicate with the second accommodating guide groove 333gh formed in the second accommodating portion 333.

Referring to FIG. 15, since the third accommodating guide groove 335gh according to one embodiment of the present disclosure is formed in a groove shape, the guide portion 332 formed in the first accommodating portion 331 may pass through the second accommodating guide groove 333gh and the third accommodating guide groove 335gh, the third accommodating portion 335 and the second accommodating portion 333 may be sequentially stacked and disposed on the first accommodating portion 331, and a coupling path between the first accommodating portion 331, the second accommodating portion 333, and the third accommodating portion 335 may be provided.

Referring to FIG. 15, a groove (not denoted by reference numeral) having a curved shape may be formed in the third accommodating portion 335 according to one embodiment of the present disclosure, and the second driving portion 350 to be described below, specifically, the driving control portion 353 protruding from the second driving body 351, may be seated therein.

The driving control portion 353 according to one embodiment of the present disclosure may rotate clockwise or counterclockwise inside the groove along a rotational central axis AX.

A plurality of driving control portions 353 to be formed in the second driving portion 350 may be provided and may protrude from both sides thereof, and a plurality of grooves in which the driving control portions 353 may be seated may be provided to correspond to the plurality of driving control portions 353.

Referring to FIG. 15, a hole (not denoted by reference numeral) communicating with a hole formed in the first accommodating portion 331 may be formed in the third accommodating portion 335 according to one embodiment of the present disclosure. A support bar 336 connecting a preset region may be formed to extend from the hole.

Referring to FIG. 15, the support bar 336 according to one embodiment of the present disclosure may be in contact with and support a lower surface (see FIG. 17) of the second driving portion 350 to be described below. Specifically, the support bar 336 may be in surface contact with the lower surface of the second driving portion 350.

Referring to FIGS. 15 and 17, due to the support bar 336 being formed in the third accommodating portion 335 according to one embodiment of the present disclosure, when the second driving portion 350 is rotated using a longitudinal central axis of the driving control portion 353 as a rotational central axis, it is possible to limit a rotation radius of the second driving portion 350.

That is, since the lower surface (see FIG. 17) of the second driving portion 350 is hung on the support bar 336, it is possible to prevent the second driving portion 350 from passing through a corresponding position to be rotated toward the first driving portion 340 accommodated in the first accommodating portion 331 and it is possible to stably support a position of the second driving portion 350.

Referring to FIGS. 14, 15, and 17 to 20, the first driving portion 340 according to one embodiment of the present disclosure may be accommodated in the base portion 330 and may include a first magnetic force portion 345.

The first magnetic force portion 345 according to one embodiment of the present disclosure may contain a magnetic material and may be formed of a permanent magnet, specifically, a magnet having a low coercive force (for example, an alnico magnet).

Referring to FIGS. 14 and 17, the first driving portion 340 according to one embodiment of the present disclosure may be accommodated in the base portion 330, specifically, the first accommodating portion 331, and may be disposed adjacent to the driving source portion 310 accommodated in the first accommodating portion 331.

Specifically, the first driving portion 340 may be disposed inside the driving source portion 310. The first driving portion 340 may share a longitudinal central axis with the driving source portion 310.

The first magnetic force portion 345 according to one embodiment of the present disclosure may have a relatively greater magnetic force than a second magnetic force portion 355 provided in the second driving portion 350.

As a result, an external force applied by a user may be applied to the expression portion 320, and in a situation in which the second driving portion 350 may not rotate, after the external force applied to the expression portion 320 is removed, the second magnetic force portion 355 and the second driving portion 350 in which the second magnetic force portion 355 is disposed may be rotated by a magnetic force of the first magnetic force portion 345 to move the expression portion 320 in the first direction and a direction opposite to the first direction.

That is, even when power of a power supply, which is provided for a relatively short time, is not transmitted to the second driving portion 350 through the driving source portion 310 and the first driving portion 340 due to an external force applied to the expression portion 320, the first driving portion 340 may be disposed to have polarity in a preset direction by a current applied to the driving source portion 310, and when the external force applied to the expression portion 320 is removed, the second driving portion 350 may perform angular movement or rotational movement by polarity of the first magnetic force portion 345 provided in the first driving portion 340.

The first magnetic force portion 345 according to one embodiment of the present disclosure may have a first magnetic region 345a (N pole or S pole) and a second magnetic region 345b (S pole or N pole) having different polarities. The first magnetic region 345a and the second magnetic region 345b having different polarities may be arranged at one point of the first magnetic force portion 345 in a direction from the driving source portion 310 toward the expression portion 320, for example, in a vertical direction (see FIG. 14).

Referring to FIG. 17, in a state in which a position of the first magnetic force portion 345 according to one embodiment of the present disclosure is fixed inside the driving source portion 310, the first magnetic region 345a and the second magnetic region 345b may be vertically formed (see FIG. 17), and when a current is applied to the driving source portion 310, polarities of the first magnetic region 345a and the second magnetic region 345b formed in the first magnetic force portion 345 may be changed.

In the information output device 300 according to one embodiment of the present disclosure, the driving source portion 310 surrounds the first magnetic force portion 345 and polarity of the first magnetic force portion 345 is changed when a current is applied to the driving source portion 310, but the present disclosure is not limited thereto. Various modifications may be implemented without departing from the technical spirit in such a manner that a current is directly or indirectly applied to the first magnetic force portion 345 and the polarities of the first magnetic region 345a and the second magnetic region 345b may be changed.

Since the polarities of the first magnetic region 345a and the second magnetic region 345b positioned in the first magnetic force portion 345 are formed, power may be transmitted to the second driving portion 350, and specifically, an attractive force or a repulsive force may be generated for the second magnetic force portion 355 provided in the second driving portion 350.

That is, when a current is applied to the driving source portion 310, polarity may be formed in the first driving portion 340, specifically, the first magnetic force portion 345, and according to polarity formed in the first magnetic region 345a positioned relatively close to the second driving portion 350, the second magnetic force portion 355 provided in the second driving portion 350 may be pushed or pulled.

By an interaction between the first magnetic force portion 345 provided in the first driving portion 340 and the second magnetic force portion 355 provided in the second driving portion 350 according to one embodiment of the present disclosure, the second driving portion 350 may perform angular movement or rotational movement and may transmit power to the expression portion 320.

Referring to FIGS. 1 to 17, the second driving portion 350 according to one embodiment of the present disclosure may be disposed between the first driving portion 340 and the expression portion 320 and may be rotatably disposed in the base portion 330.

The second driving portion 350 may perform angular movement or rotational movement according to the driving of the first driving portion 340 and may transmit power to the expression portion 320.

Referring to FIGS. 17 to 20, the second driving portion 350 according to one embodiment of the present disclosure may maintain a state of being in contact with the expression portion 320.

As a result, when the second driving portion 350 receives power from the first driving portion 340 and performs angular movement or rotational movement, the expression portion 320 in contact with the second driving portion 350 may be moved in the first direction away from the driving source portion 310 or the first driving portion 340 (top-to-bottom direction in FIG. 17) or a direction opposite to the first direction (bottom-to-top direction in FIG. 17).

Referring to FIG. 17, the second driving portion 350 according to one embodiment of the present disclosure may be spaced apart from the first driving [art 40 by a preset interval.

Referring to FIGS. 14, 16, and 17, the second driving portion 350 according to one embodiment of the present disclosure may include the second driving body 351 and the second magnetic force portion 355.

Referring to FIGS. 1 to 17, the second driving body 351 may be for accommodating the second magnetic force portion 355 and may be accommodated in the base portion 330, specifically, the third accommodating portion 335.

Referring to FIGS. 14 and 17 to 20, the second driving body 351 according to one embodiment of the present disclosure may be rotatably disposed in the third accommodating portion 335. An accommodation space capable of accommodating the second magnetic force portion 355 may be formed inside the second driving body 351.

Referring to FIGS. 16 and 17, the second driving body 351 according to one embodiment of the present disclosure may have a plurality of surfaces in a circumferential direction of the rotational central axis AX, and a driving surface 351a, a base surface 351b, and a connection surface 351c may be formed along a circumference of the rotational central axis AX.

Referring to FIGS. 16 and 17, the driving surface 351a may be a surface in contact with the expression portion 320 and may maintain a state of being in contact with the expression portion 320.

In a circumferential direction with respect to the rotational central axis AX of the second driving body 351, one side of the driving surface 351a may be connected to the base surface 351b, and the other side opposite to the one side may be connected to the connection surface 351c.

Referring to FIGS. 16 and 17, a curved portion 352 may be formed in a section in which the driving surface 351a and the base surface 351b are connected. The curved portion 352 may have a certain radius of curvature. The curved portion 352 may be formed to be convex outward.

As an optional embodiment, the curved portion 352 may include a boundary line similar to a circular shape.

The curved portion 352 formed in a preset region of the driving surface 351a may be formed at the other side (right side in FIG. 17) opposite to one side (left side in FIG. 17) of the second driving body 351 form which the driving control portion 353 is formed to protrude.

Since the curved portion 352 is formed in a region in which the driving surface 351a and the base surface 351b are connected, when the second driving body 351 receives power from the first driving portion 340 and performs angular movement or rotational movement, the expression portion 320 may move smoothly along the curved portion 352 formed on the driving surface 351a and to efficiently perform continuous and natural movement.

In addition, when the expression portion 320 moves in the first direction (from the lower side to the upper side in FIG. 17) away from the driving source portion 310 and then moves in an opposite direction (from the upper side to the lower side in FIG. 19), the expression portion 320 may move smoothly while maintaining a state of being in contact with the second driving body 351.

Referring to FIGS. 16 and 17, the base surface 351b formed in the second driving body 351 may be in contact with the base portion 330, specifically, the third accommodating portion 335. In the circumferential direction with respect to the rotational central axis AX of the second driving body 351, one side (left side in FIG. 17) of the base surface 351b may be connected to the connection surface 351c, and the other side (right side in FIG. 17) thereof may be connected to the driving surface 351a.

The base surface 351b may be formed to be flat and may be disposed on the third accommodating portion 335 in a state of being in surface contact with the support bar 336 formed on the third accommodating portion 335. Thus, an initial position (position in FIG. 17) of the second driving body 351 may be maintained, and the second driving body 351 may be stably supported on the third accommodating portion 335.

Referring to FIGS. 16 and 17, the connection surface 351c formed in the second driving body 351 may be a surface that connects the base surface 351b and the driving surface 351a and may be formed to be flat. A section in which the connection surface 351c and the base surface 351b are connected may have a certain radius of curvature and may be formed in a curved shape.

Thus, the second driving body 351 may stably rotate on the third accommodating portion 335 when rotating about the longitudinal central axis of the driving control portion 353 to be described below as the rotational central axis AX.

Referring to FIGS. 16 and 17, except for the section in which the connection surface 351c and the base surface 351b are connected, regions formed to be flat may be disposed to form a certain angle. Thus, it is possible to limit a rotation range of the second driving body 351 with respect to the rotational central axis AX.

That is, a virtual straight line passing through a flat region in the connection surface 351c and a virtual straight line passing through a flat region in the base surface 351b may be disposed to form a certain angle.

According to one embodiment of the present disclosure, surfaces respectively formed to be flat in the connection surface 351c and the base surface 351b may be perpendicular to each other, and a rotation range of the second driving body 351 may be set to 90 degrees.

However, the present disclosure is not limited thereto, and the angle formed by the surfaces respectively formed to be flat in the connection surface 351c and the base surface 351b may be variously formed according to the rotation range of the second driving body 351.

Figure 18:
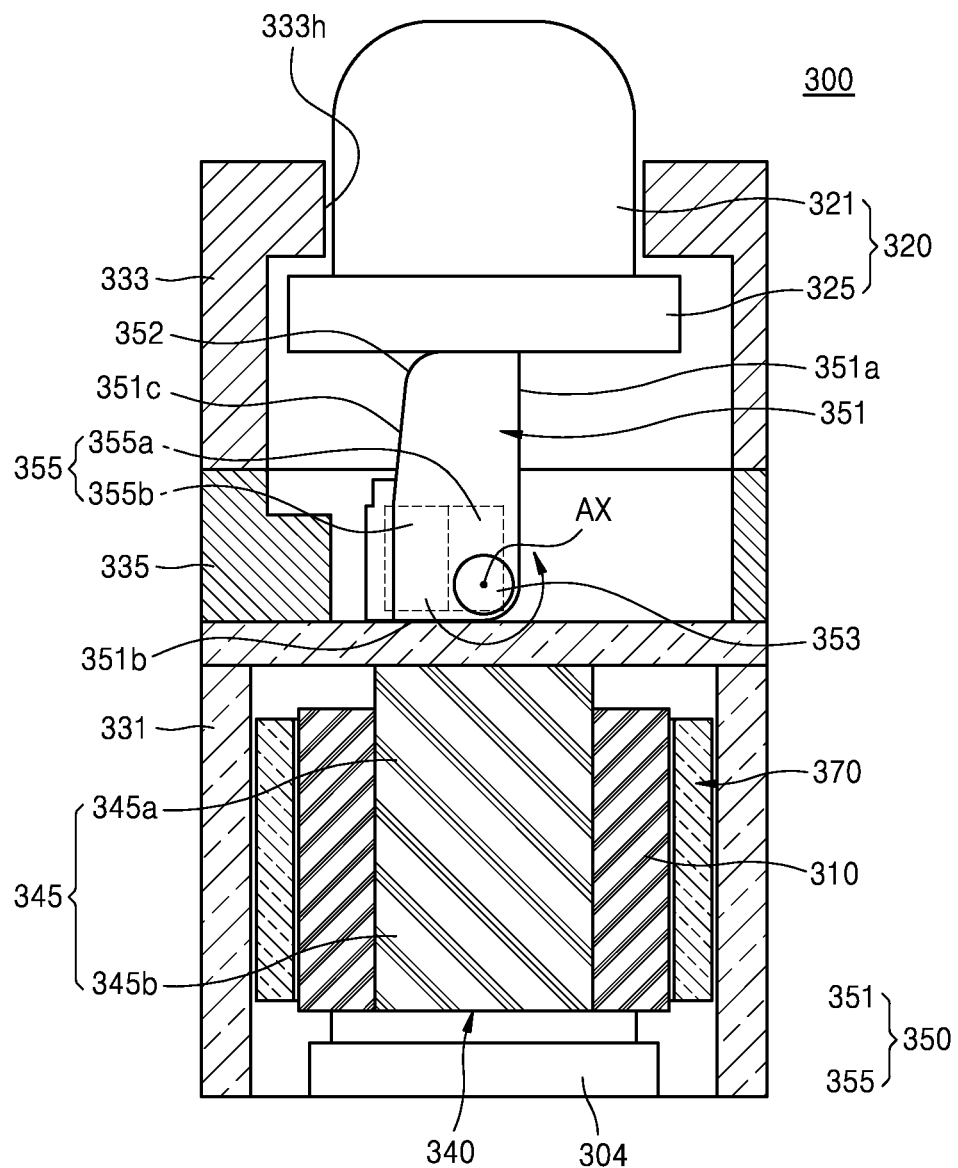

Referring to FIG. 18, since the connection surface 351c is formed to be flat, when the second driving body 351 rotates, the connection surface 351c may be in surface contact with the support bar 336 formed in the third accommodating portion 335 and may stably maintain a position.

Referring to FIGS. 16 to 20, the driving control portions 353 may be formed to protrude outward from both side surfaces of the second driving body 351 according to one embodiment of the present disclosure. The driving control portion 353 may extend along a longitudinal central axis, and the longitudinal central axis of the driving control portion 353 may be formed as the rotational central axis AX of the second driving body 351.

Referring to FIGS. 16 to 20, the driving control portion 353 according to one embodiment of the present disclosure may be formed at a point spaced a certain distance apart from a center on a side surface of the second driving body 351 from which the driving control portion 353 is formed to protrude.

In the present specification, the side surface of the second driving body 351 refers to one surface of the second driving body 351 viewed from the front in FIGS. 17 to 20.

That is, referring to FIG. 17, the driving control portion 353 may be positioned to be biased to one side (left side in FIG. 17) with respect to the center of the second driving body 351 and may be positioned on a longitudinal central axis of the first driving portion 340.

With respect to the center of the second driving body 351, the curved portion 352 according to one embodiment of the present disclosure may be formed at the other side (right side in FIG. 17) opposite to one side (left side in FIG. 17) at which the driving control portion 353 is positioned. Thus, when the second driving body 351 rotates using the longitudinal central axis AX of the driving control portion 353 as a rotational central axis, a torque force may be easily generated, and the second driving portion 350 may be allowed to perform angular movement or rotational movement, thereby allowing the expression portion 320 to efficiently move and improving the precise expression power of the information output device 300.

In addition, since a torque force for the second driving portion 350 is easily generated, power consumption of the information output device 300 may be reduced.

Referring to FIGS. 17 to 20, the driving control portions 353 formed on both side surfaces of the second driving body 351 may be seated in grooves formed in the third accommodating portion 335 and may be rotated clockwise or counterclockwise in the grooves.

That is, the second driving portion 350 according to one embodiment of the present disclosure may rotate clockwise or counterclockwise using the second driving control portion 353 as a rotational center.

Referring to FIGS. 1 to 20, the second magnetic force portion 355 according to one embodiment of the present disclosure may be disposed inside the second driving body 351 and may have regions having different polarities.

The second magnetic force portion 355 according to one embodiment of the present disclosure may include a magnetic material and may include, for example, a permanent magnet. The second magnetic force portion 355 may have a relatively smaller magnetic force than the first magnetic force portion 345.

As a result, a region formed in the second magnetic force portion 355 may be changed by the first magnetic force portion 345, and the second driving portion 350 in which the second magnetic force portion 355 is accommodated may be moved. However, due to a magnetic force of the second magnetic force portion 355, a magnetic region formed in the first magnetic force portion 345 may be prevented from being changed.

In other words, an external force applied by a user may be applied to the expression portion 320, and in a situation in which the second driving portion 350 may not rotate, after the external force applied to the expression portion 320 is removed, the second magnetic force portion 355 and the second driving portion 350 in which the second magnetic force portion 355 is disposed may be rotated by a magnetic force of the first magnetic force portion 345 to move the expression portion 320 in the first direction and a direction opposite to the first direction.

That is, even when power of the power supply, which is provided for a relatively short time, is not transmitted to the second driving portion 350 through the first driving portion 340 due to an external force applied to the expression portion 320, polarity of the first driving portion 340, specifically, polarity of the first magnetic force portion 345, may be formed in a preset direction by power transmitted from the driving source portion 310, and when the external force applied to the expression portion 320 is removed, the second driving portion 350 may perform angular movement or rotational movement by the first driving portion 340.

Referring to FIGS. 17 to 20, the second magnetic force portion 355 according to one embodiment of the present disclosure is spaced apart from the curved portion 352 formed in the second driving body 351, and the second driving body 351 may be disposed relatively close to the rotational central axis AX.

That is, the second magnetic force portion 355 may be disposed to overlap the driving control portion 353 formed to protrude from the second driving body 351. As a result, when a current is applied to the driving source portion 310 and polarity of the first driving portion 340, specifically, polarity of the first magnetic force portion 345, is formed, an attractive force or a repulsive force between the first magnetic force portion 345 and the second magnetic force portion 355 is generated. In this case, the curved portion 352 spaced apart from the rotational central axis may be rotated clockwise or counterclockwise, and a torque force for the second driving portion 350 may be easily generated.

Referring to FIG. 17, the longitudinal central axis of the driving control portion 353 formed in the second driving body 351 may be perpendicular to a longitudinal central axis of the first magnetic force portion 345.

Referring to FIGS. 17 to 20, the second magnetic force portion 355 according to one embodiment of the present disclosure may have a first magnetic region 355a (N pole or S pole) and a second magnetic region 355b (S pole or N pole) which have different polarities, and the first magnetic region 355a and the second magnetic region 355b having different polarities may be disposed in a height direction (vertical direction in FIG. 17) of the second driving body 351.

Referring to FIGS. 17 to 20, by an attractive force or a repulsive force generated between the second magnetic force portion 355 and the first magnetic force portion 345 according to one embodiment of the present disclosure, the second driving body 351 may rotate clockwise or counterclockwise using the longitudinal central axis AX of the driving control portion 353 as a rotational central axis to vertically move the expression portion 320 (see FIG. 17).

Referring to FIGS. 14, 15, and 17, the shielding portion 370 according to one embodiment of the present disclosure may be accommodated in the base portion 330, specifically, the first accommodating portion 331, and may be formed to be hollow.

The shielding portion 370 according to one embodiment of the present disclosure may be disposed between the first accommodating portion 331 and the driving source portion 310 and may be formed of a high permeability material. The shielding portion 370 may be formed in a shape surrounding the driving source portion 310 and may block a magnetic field, which is generated when a current is applied to the driving source portion 310, from being transmitted to the outside.

In addition, the single information output device 300 including the driving source portion 310, the first driving portion 340, the second driving portion 350, and the expression portion 320 and another information output unit disposed adjacent to the single information output device 300 are allowed to remain unaffected by a magnetic field so that a plurality of information output units may be independently driven.

The shielding portion 370 according to one embodiment of the present disclosure may be formed in a cylindrical shape, but the present disclosure is not limited thereto, and various modifications may be implemented.

The operating principle and effect of the information output device 300 according to one embodiment of the present disclosure as described above will be described.

Referring to FIGS. 1 to 20, the information output device 300 according to one embodiment of the present disclosure may include the substrate portion 301, the driving source portion 310, the expression portion 320, the base portion 330, the first driving portion 340, the second driving portion 350, and the shielding portion 370.

Referring to FIGS. 14 and 17 to 20, the driving source portion 310 according to one embodiment of the present disclosure may be formed of a coil, and a magnetic field may be formed when a current is received from an external power supply through the substrate portion 301.

Different polarities may be formed in the first driving portion 340, specifically, the first magnetic force portion 345 by the magnetic field formed in the driving source portion 310.

Referring to FIG. 17, the first magnetic region 345a formed in the first magnetic force portion 345 when the driving source portion 310 receives a current may be formed as an S pole, and the second magnetic region 345b formed closer to the substrate portion 301 than the first magnetic region 345a may be formed as an N pole.

Referring to FIG. 17, the first magnetic region 355a formed in the second magnetic force portion 355 accommodated inside the second driving body 3651 may be formed as an S pole, and the second magnetic region 355b formed closer to the expression portion 320 than the first magnetic region 355a may be formed as an N pole.

In a polarity arrangement of the second magnetic force portion 355, the first magnetic region 355a is formed as the S pole and the second magnetic region 355b is formed as the N pole. Accordingly, A repulsive force is formed between the second magnetic force portion 355 and first magnetic force portion 345.

Referring to FIGS. 17 and 18, since the repulsive force is generated between the first magnetic force portion 345 and the second magnetic force portion 355, the second driving body 351 may rotate counterclockwise (see FIG. 18) using the driving control portion 353 as the rotational central axis AX.

That is, the first magnetic region 355a formed in the second magnetic force portion 355 tends to move to a position away from the driving source portion 310, and the second magnetic region 355b moves to a position toward the driving source portion 310 by an attractive force.

Since the driving control portion 353 is disposed on the longitudinal central axis of the first magnetic force portion 345, and the curved portion 352, which is formed in a region in which the driving surface 351a and the base surface 351b are connected in the driving body portion, is spaced apart from the longitudinal central axis of the driving control portion 353 and the first magnetic force portion 345, a torque force may be easily generated.

In addition, by allowing the second driving portion 350 to perform angular movement or rotational movement, the movement of the expression portion 320 may be efficiently performed, and the precise expression power of the information output device 300 may be improved.

In addition, since a torque force for the second driving portion 350 is easily generated, power consumption of the information output device 300 may be reduced.

As the second driving portion 350 rotates, the expression portion 320 also moves along the curved portion 352 in a direction away from the driving source portion 310 and the first driving portion 340 (bottom-to-top direction in FIG. 18).

Referring to FIG. 18, since the connection surface 351c connected to each of the driving surface 351a and the base surface 351b is formed to be flat, and a virtual straight line passing through the connection surface 351c is disposed to be perpendicular to a virtual straight line passing through the base surface 351b, the second driving portion 350 being rotated at a preset angle or more may be controlled.

Figure 19:
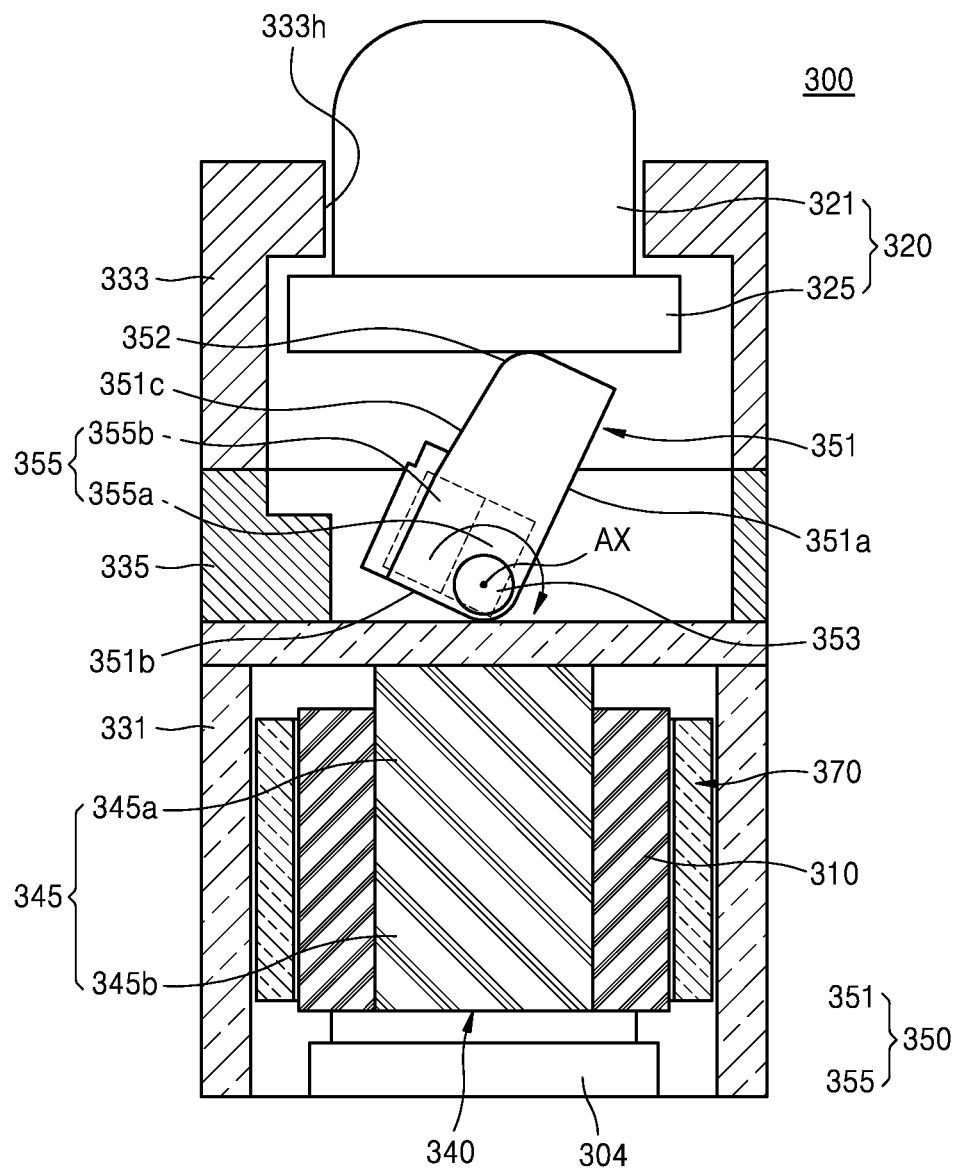
Figure 20:
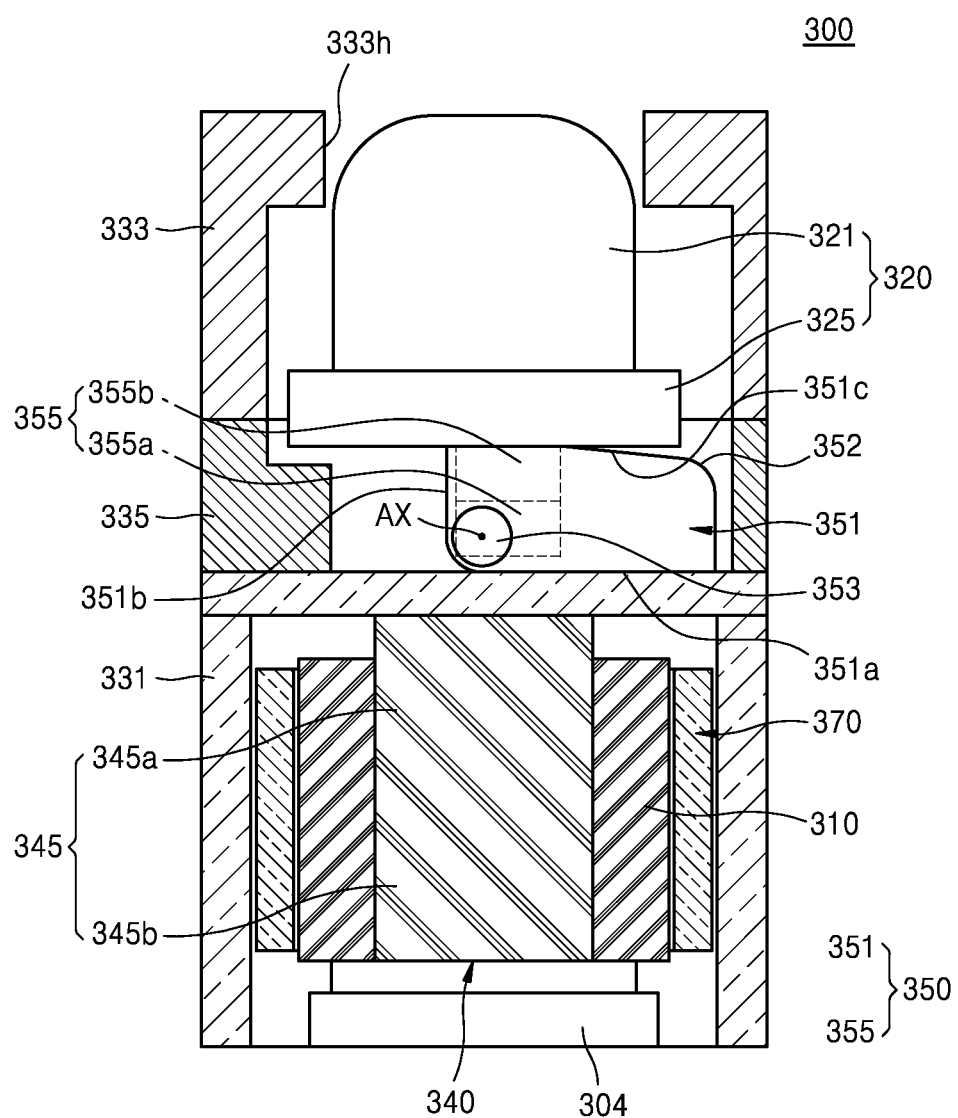

Referring to FIGS. 19 and 20, a state in which power applied to the driving source portion 310 is cut off is shown, and unlike that shown in FIG. 17, the first magnetic region 345a formed in the first magnetic force portion 345 may be formed as an N pole, and the second magnetic region 345b formed in the first magnetic force portion 345 relatively closer to the substrate portion 301 than the first magnetic region 345a may be formed as an S pole.

Thus, the first magnetic region 355a of the second magnetic force portion 355 disposed relatively close to the first magnetic force portion 345 moves toward the driving source portion 310 by an attractive force, and the second magnetic region 355b of the second magnetic force portion 355 moves in a direction away from the driving source portion 310 by a repulsive force.

In other words, the second driving body 351 rotates clockwise using the central axis of the longitudinal direction of the driving control portion 353 as the rotational central axis AX.

As a result, the second driving body 351, specifically, the expression portion 320 maintaining a state of being in contact with the driving surface 351a may move toward the driving source portion 310 (top-to-bottom direction in FIG. 19).

In the information output device 300 according to one embodiment of the present disclosure, the driving source portion 310 may surround the first driving portion 340, and as a current is applied to the driving source portion 310, the polarity of the first magnetic force portion 345 may be changed, and power may be transmitted to the second driving portion 350 due to an interaction with the second magnetic force portion 355 provided in the second driving portion 350.

In addition, since the polarity of the first magnetic force portion 345 may be changed by a current applied to the driving source portion 310 in a state in which a position of the first driving portion 340 is maintained, a separate power transmission structure may not be required and the structure to simplify a structure.

In addition, the curved portion 352 is formed in a region in which the driving surface 351a and the base surface 351b formed in the second driving body 351 are connected, in a process of moving the expression portion 320, the expression portion 320 may maintain a state of being in contact with the second driving body 351, may move smoothly, and may effectively perform continuous and natural movement. The particular implementations shown and described herein are illustrative embodiments and are not intended to otherwise limit the scope of the present disclosure in any way. In addition, the connecting lines, or connection members shown in the drawings presented are intended to represent exemplary functional relationships and/or physical or logical couplings between the components. It should be noted that many alternative or additional functional relationships, physical connections, or logical connections may be present in a practical device. Moreover, no item or component is essential to the practice of the present disclosure unless the components is specifically described as "essential" or "critical."

Therefore, the spirit of the present disclosure is not limited to the above-described embodiments, and not only the claims to be described later, but also all ranges equivalent to or equivalently changed to the claims belong to the scope of the spirit of the present disclosure.

INDUSTRIAL APPLICABILITY

According to the present disclosure, an information output device is provided. In addition, embodiments of the present disclosure may be applied to a device that allows a user to recognize information using industrially used tactile senses.

The invention claimed is:
1. An information output device comprising one or more information output units,
  wherein the one or more information output unit each comprise a driving source portion connected to a power supply and disposed such that a current flows,
  an expression portion formed and disposed to be detected by a user,
  a base portion in which the driving source portion and the expression portion are accommodated,
  a first driving portion disposed in the base portion and driven by a current flowing in the driving source portion, and
  a second driving portion which is disposed between the first driving portion and the expression portion, performs angular movement or rotational movement according to driving of the first driving portion, and is formed to move the expression portion in a first direction toward the first driving portion and in a direction opposite to the first direction.

2. The information output device of claim 1, wherein a first magnetic force portion, which has regions having different polarities, is disposed in the first driving portion, and a second magnetic force portion, which has regions having different polarities, is disposed in the second driving portion.

3. The information output device of claim 1, wherein the driving source portion is disposed outside the first driving portion and is formed of a coil.

4. The information output device of claim 1, wherein the base portion comprises a first accommodating portion in which the driving source portion is accommodated, a second accommodating portion which is disposed to face the first accommodating portion and accommodates the expression portion, and a third accommodating portion which connects the first accommodating portion and the second accommodating portion to each other and in which the first driving portion and the second driving portion are disposed.

5. The information output device of claim 1, comprising a plurality of information output units, wherein the plurality of information output units are spaced apart from each other in one direction or another direction.

\* \* \* \* \*